United States Patent
Ko et al.

(10) Patent No.: US 9,300,375 B2
(45) Date of Patent: *Mar. 29, 2016

(54) METHOD AND DEVICE FOR EFFICIENT FEEDBACK IN WIRELESS COMMUNICATION SYSTEM SUPPORTING MULTIPLE ANTENNAS

(71) Applicant: LG ELECTRONICS INC., Seoul (KR)

(72) Inventors: Hyun Soo Ko, Anyang-si (KR); Jae Hoon Chung, Anyang-si (KR); Seung Hee Han, Anyang-si (KR); Moon Il Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/540,714

(22) Filed: Nov. 13, 2014

(65) Prior Publication Data

US 2015/0139346 A1    May 21, 2015

Related U.S. Application Data

(63) Continuation of application No. 13/631,058, filed as application No. PCT/KR2011/002572 on Apr. 12, 2011, now Pat. No. 8,917,790.

(60) Provisional application No. 61/323,345, filed on Apr. 12, 2010, provisional application No. 61/334,948, filed on May 14, 2010.

(51) Int. Cl.
*H04K 1/02* (2006.01)
*H04B 7/04* (2006.01)
(Continued)

(52) U.S. Cl.
CPC ............ *H04B 7/0417* (2013.01); *H04B 7/0456* (2013.01); *H04B 7/0478* (2013.01);
(Continued)

(58) Field of Classification Search
CPC .. H04B 7/0639; H04B 7/0417; H04B 7/0626; H04B 7/0632; H04B 7/0456; H04B 7/0478; H04B 7/0617; H04B 7/0619; H01L 1/0026; H01L 25/03343; H01L 25/03898
USPC ......................................... 375/267, 296, 219
See application file for complete search history.

(56) References Cited

U.S. PATENT DOCUMENTS

2009/0046805 A1*  2/2009  Kim et al. ..................... 375/295
2009/0201825 A1*  8/2009  Shen et al. .................... 370/252
(Continued)

FOREIGN PATENT DOCUMENTS

JP    2011-530253    12/2011
JP    2013-524621    6/2013
(Continued)

OTHER PUBLICATIONS

The State Intellectual Property Office of the People's Republic of China Application Serial No. 201180027807.9, Office Action dated Jul. 30, 2014, 5 pages.

(Continued)

*Primary Examiner* — Leila Malek
(74) *Attorney, Agent, or Firm* — Lee, Hong, Degerman, Kang & Waimey

(57) ABSTRACT

The present description relates to a wireless communication system, and more particularly, discloses a method and a device for efficient feedback in a wireless communication system supporting multiple antennas. According to one embodiment of the present invention, the method for transmitting channel status information on a downlink transmission through an uplink, in the wireless communication system, comprises the following steps: transmitting a rank indicator (RI) in a first subframe; transmitting a first precoding matrix index (PMI) in a second subframe; and transmitting a second PMI and channel quality information (CQI) in a third subframe, wherein the precoding matrix to be applied to the transmission of the downlink can be determined by a combination of the first and second PMIs.

8 Claims, 25 Drawing Sheets

(51) Int. Cl.
  *H04B 7/06* (2006.01)
  *H04L 25/03* (2006.01)
  *H04L 1/00* (2006.01)
  *H04L 5/00* (2006.01)
  *H04L 1/18* (2006.01)
  *H04W 88/02* (2009.01)
  *H04W 88/08* (2009.01)

(52) U.S. Cl.
  CPC .............. *H04B 7/0486* (2013.01); *H04B 7/063* (2013.01); *H04B 7/065* (2013.01); *H04B 7/0626* (2013.01); *H04B 7/0632* (2013.01); *H04B 7/0639* (2013.01); *H04B 7/0658* (2013.01); *H04L 1/0026* (2013.01); *H04L 1/0029* (2013.01); *H04L 1/0031* (2013.01); *H04L 25/03343* (2013.01); *H04L 25/03898* (2013.01); *H04L 25/03949* (2013.01); *H04L 1/1861* (2013.01); *H04L 5/0007* (2013.01); *H04W 88/02* (2013.01); *H04W 88/08* (2013.01)

(56) References Cited

U.S. PATENT DOCUMENTS

| | | |
|---|---|---|
| 2009/0247214 A1 | 10/2009 | Cai et al. |
| 2010/0034312 A1 | 2/2010 | Muharemovic et al. |
| 2010/0118817 A1* | 5/2010 | Damnjanovic et al. ....... 370/329 |
| 2011/0142147 A1* | 6/2011 | Chen et al. ..................... 375/260 |
| 2012/0076023 A1* | 3/2012 | Ko et al. ........................ 370/252 |

FOREIGN PATENT DOCUMENTS

| | | |
|---|---|---|
| JP | 2013-527675 | 6/2013 |
| WO | 2006/050635 | 5/2006 |
| WO | 2009/119988 | 10/2009 |

OTHER PUBLICATIONS

Sharp, "CQI, PMI, and rank report feedback interval," 3GPP TSG RAN WG1 Meeting #52, R1-080764, Feb. 2008, 2 pages.

Zte, "Discussion on unified framework for multi-granular feedback," 3GPP TSG RAN WG1 Meeting #60bis, R1-101838, Apr. 2010, 7 pages.

Ericsson, et al., "A Flexible Feedback Concept," 3GPP TSG-RAN WG1 #59bis, R1-100051, Jan. 2010, 5 pages.

Samsung, "Discussions on feedback schemes with multiple rank/PMIs and CQIs," 3GPP TSG RAN WG1 Meeting #60bis, R1-102201, Apr. 2010, 4 pages.

* cited by examiner

METHOD AND DEVICE FOR EFFICIENT FEEDBACK IN WIRELESS COMMUNICATION SYSTEM SUPPORTING MULTIPLE ANTENNAS

CROSS-REFERENCE TO RELATED APPLICATIONS

This application is a continuation of U.S. patent application Ser. No. 13/641,058, filed on Oct. 12, 2012, now U.S. Pat. No. 8,917,790, which is the National Stage filing under 35 U.S.C. 371 of International Application No. PCT/KR2011/002572, filed on Apr. 12, 2011, which claims the benefit of U.S. Provisional Application Nos. 61/323,345, filed on Apr. 12, 2010, and 61/334,948, filed on May 14, 2010, the contents of which are all hereby incorporated by reference herein in their entirety.

TECHNICAL FIELD

The present description relates to wireless communication system, and more specifically, to a method and device for efficient feedback in a wireless communication system supporting multiple antennas.

BACKGROUND ART

Multiple Input Multiple Output (MIMO) can increase the efficiency of data transmission and reception using multiple transmit antennas and multiple receive antennas. According to MIMO, a transmitting end or a receiving end of a wireless communication system uses multiple antennas to improve communication capacity or performance. MIMO can also be called a multi-antenna technology. For successful multi-antenna transmission, it is necessary to feedback information on a multi-antenna channel from a receiving end that receives the multi-antenna channel.

In a conventional multi-antenna wireless communication system, a rank indicator (RI), a precoding matrix index (PMI), channel quality indicator (CQI), etc. are defined as information fed back to a transmitting end from a receiving end. This feedback information is configured as information suitable for conventional multi-antenna transmission.

Introduction of a new system having an extended antenna configuration compared to the conventional multi-antenna wireless communication system is under discussion. For example, a new system having an extended antenna configuration can provide improved system capacity by supporting MIMO transmission through 8 transmit antennas, whereas the convention system supports up to 4 transmit antennas.

DISCLOSURE

Technical Problem

The new system supporting an extended antenna configuration performs more complicated MIMO transmission than conventional MIMO transmission, and thus it is impossible to support MIMO transmission operation of the new system using only feedback information defined for the conventional MIMO transmission.

An object of the present invention is to provide a method and device for configuring and transmitting feedback information for properly and efficiently supporting MIMO transmission according to an extended antenna configuration.

The technical problems solved by the present invention are not limited to the above technical problems and those skilled in the art may understand other technical problems from the following description.

Technical Solution

According to one aspect of the present invention, a method for transmitting channel state information on downlink transmission through an uplink in a wireless communication system includes: transmitting a rank indicator (RI) in a first subframe; transmitting a first precoding matrix indicator (PMI) in a second subframe; and transmitting a second PMI and a channel quality indicator (CQI) in a third subframe, wherein a preferred precoding matrix of a UE is indicated by a combination of the first PMI and the second PMI.

According to another aspect of the present invention, a method for receiving channel state information on downlink transmission through an uplink in a wireless communication system includes: receiving an RI in a first subframe; receiving a first PMI in a second subframe; and receiving a second PMI and a CQI in a third subframe, wherein a preferred precoding matrix of a UE is indicated by a combination of the first PMI and the second PMI.

According to another aspect of the present invention, a user equipment (UE) transmitting channel state information on downlink transmission through an uplink in a wireless communication system includes: a reception module for receiving a downlink signal from an eNB; a transmission module for transmitting an uplink signal to the eNB; and a processor for controlling the UE including the reception module and the transmission module, wherein the processor transmits an RI in a first subframe, transmits a first PMI in a second subframe and transmits a second PMI and a CQI in a third subframe, through the transmission module, wherein a preferred precoding matrix of a UE is indicated by a combination of the first PMI and the second PMI.

According to another aspect of the present invention, an eNB receiving channel state information on downlink transmission through an uplink in a wireless communication system includes: a reception module for receiving an uplink signal from a UE; a transmission module for transmitting a downlink signal to the UE; and a processor for controlling the eNB including the reception module and the transmission module, wherein the processor receives an RI in a first subframe, receives a first PMI in a second subframe and receives a second PMI and a CQI in a third subframe, through the reception module, wherein a preferred precoding matrix of a UE is indicated by a combination of the first PMI and the second PMI.

The following can be commonly applied to the above embodiments of the present invention.

The first PMI may indicate precoding matrix candidates applied to the downlink transmission and the second PMI may indicate one of the precoding matrix candidates.

The RI may be transmitted on a physical uplink control channel (PUCCH) of the first subframe, the first PMI may be transmitted on a PUCCH of the second subframe, and the second PMI and the CQI may be transmitted on a PUCCH of the third subframe.

The RI, the first PMI, the second PMI and the CQI may correspond to channel state information about downlink 8-transmit antenna transmission.

The RI, the first PMI, the second PMI and the CQI may correspond to feedback information about a wideband.

The RI may be transmitted according to a first reporting period, the first PMI may be transmitted according to a second reporting period, and the second PMI and the CQI may be transmitted according to a third reporting period.

The technical problems solved by the present invention are not limited to the above technical problems and those skilled in the art may understand other technical problems from the following description.

Advantageous Effects

According to embodiment of the present invention, it is possible to provide a method and device for configuring and transmitting feedback information for properly and efficiently supporting MIMO transmission according to an extended antenna configuration.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 is a conceptual diagram for illustrating component carriers (CCs) for downlink and uplink;

BEST MODE

Figure 1A:
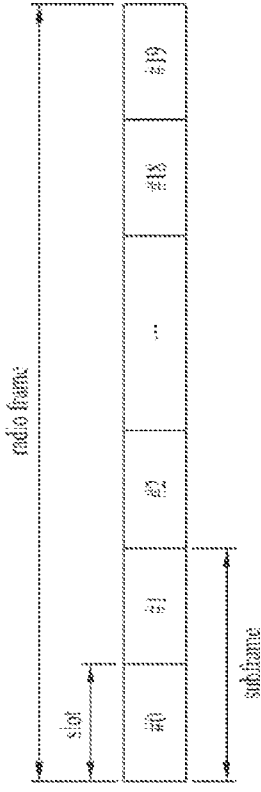
FIGS. 1A and 1B illustrate an exemplary radio frame structure.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is made, centering on a data transmission and reception relationship between a base station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc. The term 'UE' may be replaced with the term 'terminal', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (Wireless-MAN-OFDMA Reference System) and the IEEE 802.16m standard (WirelessMAN-OFDMA Advanced System). For clarity, this application focuses on the 3GPP LTE/LTE-A system. However, the technical features of the present invention are not limited thereto.

A downlink radio frame structure will now be described with reference to FIGS. 1A and 1B.

In a cellular OFDM radio packet communication system, uplink/downlink data packet transmission is performed subframe by subframe. A subframe is defined as a predetermined time interval including a plurality of OFDM symbols. 3GPP LTE standard supports type 1 radio frame structure applicable to frequency division duplex (FDD) and type 2 radio frame structure applicable to time division duplex (TDD).

FIG. 1A shows the type 1 radio frame structure. A downlink radio frame is divided into 10 subframes. Each subframe is further divided into two slots in the time domain. A unit time during which one subframe is transmitted is defined as Transmission Time Interval (TTI). For example, one subframe may be 1 ms in duration and one slot may be 0.5 ms in duration. A slot may include a plurality of OFDM symbols in the time domain and include a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

The number of OFDM symbols included in one slot may be changed according to the configuration of a Cyclic Prefix (CP). There are an extended CP and a normal CP. For example, the number of OFDM symbols included in one slot may be seven in case of a normal CP. In case of an extended CP, the length of one OFDM symbol is increased and thus the number of OFDM symbols included in one slot is less than that in case of a normal CP. In case of the extended CP, for example, the number of OFDM symbols included in one slot may be six. If a channel state is instable as is the case when a UE moves fast, the extended CP may be used in order to further reduce inter-symbol interference.

In case of a normal CP, since one slot includes seven OFDM symbols, one subframe includes 14 OFDM symbols. The first two or three OFDM symbols of each subframe may be allocated to a Physical Downlink Control Channel (PDCCH) and the remaining OFDM symbols may be allocated to a Physical Downlink Shared Channel (PDSCH).

Figure 1B:
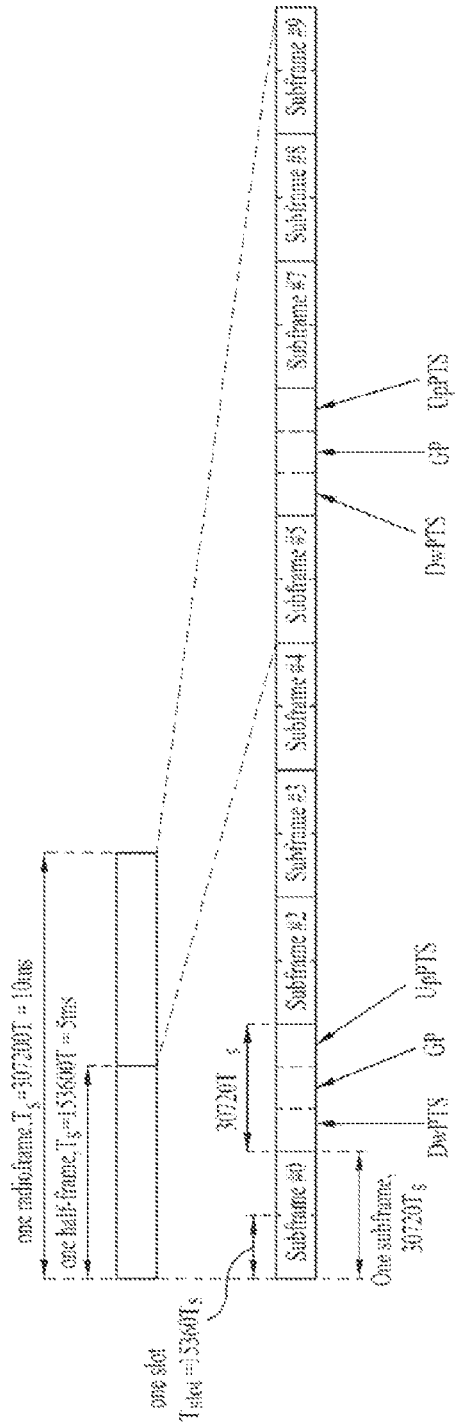

The structure of a type 2 radio frame is shown in FIG. 1B. The type 2 radio frame includes two half-frames, each of which is made up of five subframes, a downlink pilot time slot (DwPTS), a guard period (GP), and an uplink pilot time slot (UpPTS), in which one subframe consists of two slots. DwPTS is used to perform initial cell search, synchronization, or channel estimation. UpPTS is used to perform channel estimation of a base station and uplink transmission synchronization of a UE. The guard interval (GP) is located between an uplink and a downlink so as to remove interference generated in the uplink due to multi-path delay of a downlink signal. One subframe is composed of two slots irrespective of the radio frame type.

The structure of the radio frame is only exemplary. Accordingly, the number of subframes included in the radio frame, the number of slots included in the subframe or the number of symbols included in the slot may be changed in various manners.

Figure 2:
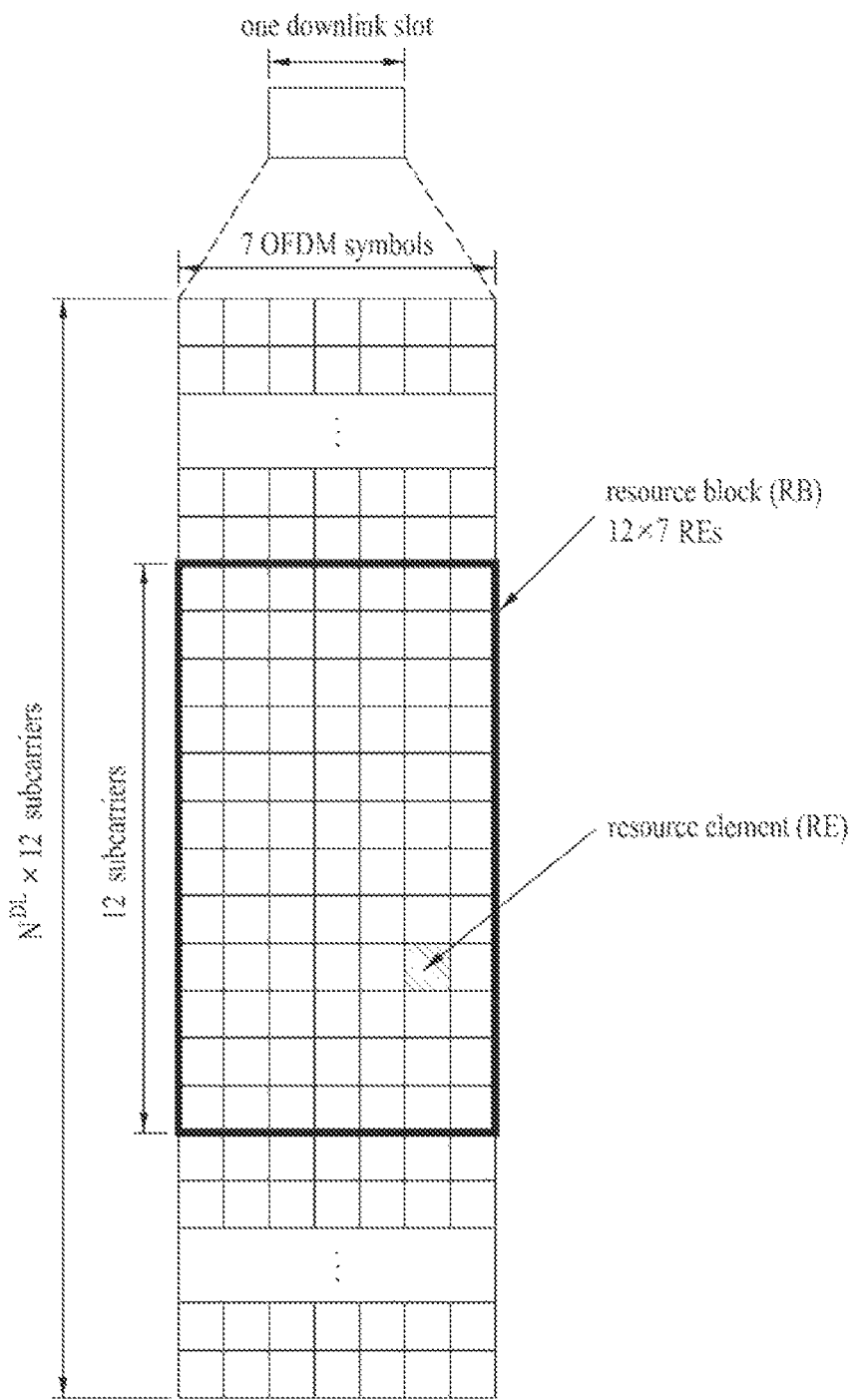
FIG. 2 illustrates a resource grid in a downlink slot.

FIG. 2 is a diagram showing a resource grid in a downlink slot. Although one downlink slot includes seven OFDM symbols in the time domain and one RB includes 12 subcarriers in the frequency domain in the figure, the scope or spirit of the present invention is not limited thereto. For example, in case of a normal Cyclic Prefix (CP), one slot includes 7 OFDM symbols. However, in case of an extended CP, one slot may include 6 OFDM symbols. Each element on the resource grid is referred to as a resource element. One RB includes 12×7 resource elements. The number $N^{DL}$ of RBs included in the downlink slot is determined based on downlink transmission bandwidth. The structure of the uplink slot may be equal to the structure of the downlink slot.

Figure 3:
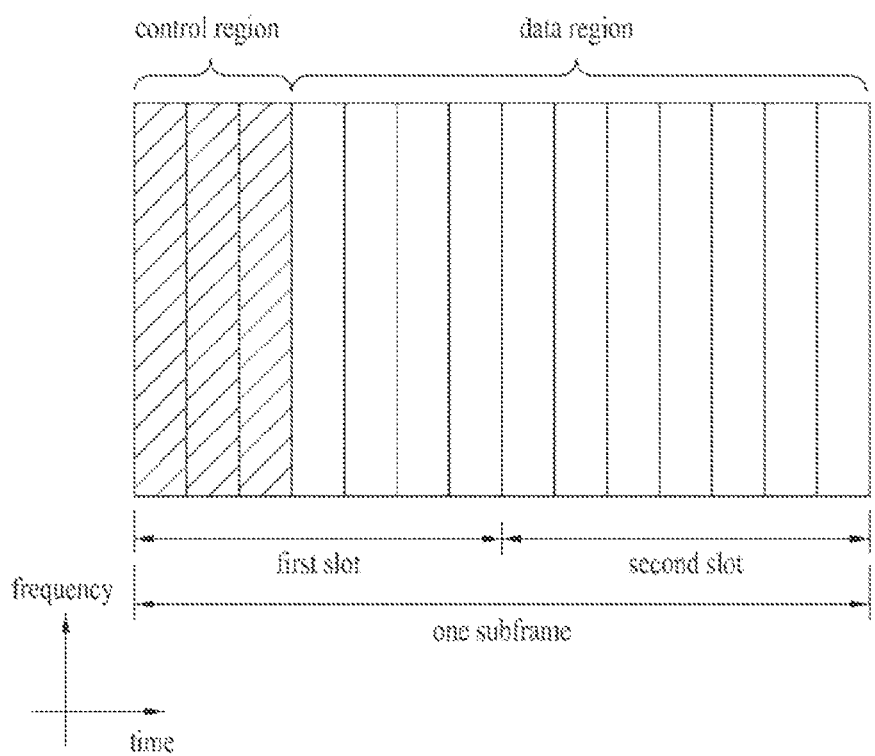
FIG. 3 illustrates a downlink subframe structure.

FIG. 3 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response to uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of a higher layer control message such as a Random Access Response (RAR) transmitted on the PDSCH, a set of transmit power control commands for individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted on an aggregation of one or several contiguous control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The base station determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
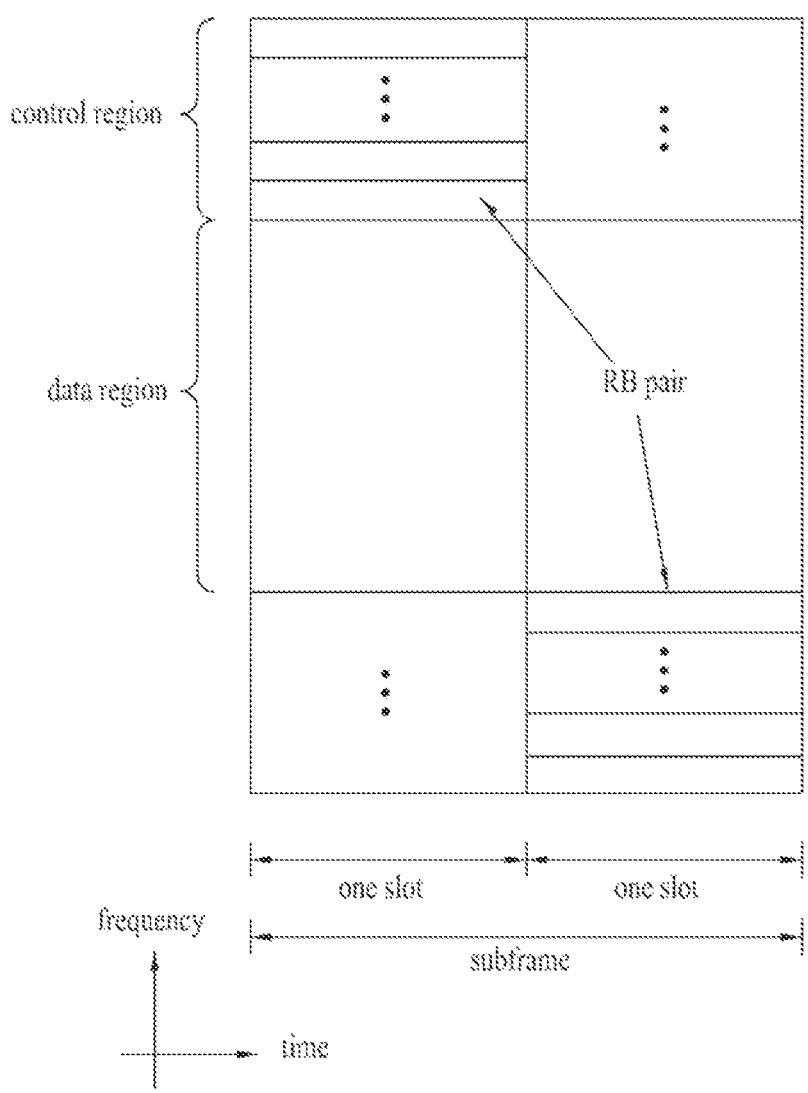
FIG. 4 illustrates an uplink subframe structure.

FIG. 4 is a diagram showing the structure of an uplink frame. The uplink subframe may be divided into a control region and a data region in a frequency region. A Physical Uplink Control Channel (PUCCH) including uplink control information is allocated to the control region. A Physical uplink Shared Channel (PUSCH) including user data is allocated to the data region. In order to maintain single carrier characteristics, one UE does not simultaneously transmit the PUCCH and the PUSCH. The PUCCH for one UE is allocated to an RB pair in a subframe. RBs belonging to the RB pair occupy different subcarriers with respect to two slots. Thus, the RB pair allocated to the PUCCH is "frequency-hopped" at a slot edge.

Carrier Aggregation

Although downlink and uplink bandwidths are different from each other, a wireless communication system typically uses one carrier. For example, a wireless communication system having one carrier for each of the downlink and the uplink and symmetry between the downlink and uplink bandwidths may be provided based on a single carrier.

The International Telecommunication Union (ITU) requests that IMT-Advanced candidates support wider bandwidths, compared to legacy wireless communication systems. However, allocation of a wide frequency bandwidth is difficult throughout most of the world. Accordingly, a technology for efficiently using small segmented bands, known as carrier aggregation (bandwidth aggregation) or spectrum aggregation, has been developed in order to aggregate a plurality of physical bands to a wider logical band.

Carrier aggregation was introduced to support increased throughput, prevent cost increase caused by introduction of wideband RF devices, and ensure compatibility with legacy systems. Carrier aggregation enables data exchange between a UE and a BS through a group of carriers each having a bandwidth unit defined in a legacy wireless communication system (e.g. 3GPP LTE Release-8 or Release-9 in case of 3GPP LTE-A). The carriers each having a bandwidth unit defined in the legacy wireless communication system may be called Component Carriers (CCs). Carrier aggregation using one or more CCs may be applied to each of downlink and uplink. Carrier aggregation may support a system bandwidth of up to 100 MHz by aggregating up to five CCs each having a bandwidth of 5, 10 or 20 MHz.

A downlink CC and an uplink CC may be represented as a DL CC and a UL CC, respectively. A carrier or CC may be represented as a cell in terms of function in the 3GPP LTE system. Thus, a DL CC and a UL CC may be referred to as a DL cell and a UL cell, respectively. Hereinbelow, the terms 'carriers', 'component carriers', 'CCs' or 'cells' will be used to signify a plurality of carriers to which carrier aggregation is applied.

While the following description exemplarily uses a BS (or cell) as a downlink transmission entity and exemplarily uses a UE as an uplink transmission entity, the scope or spirit of the present invention is not limited thereto. That is, even when a relay node (RN) may be used as a downlink transmission entity from a BS to a UE and or be used as an uplink reception entity from a UE to a BS, or even when the RN may be used an uplink transmission entity for a UE or be used as a downlink reception entity from a BS, it should be noted that the embodiments of the present invention can be applied without difficulty.

Downlink carrier aggregation may be described as a BS supporting downlink transmission to a UE in frequency resources (subcarriers or physical resource blocks [PRBs]) of one or more carrier bands in time resources (allocated in units of a subframe). Uplink carrier aggregation may be described as a UE supporting uplink transmission to a BS in frequency resources (subcarriers or PRBs) of one or more carrier bands in time resources (allocated in units of a subframe).

Figure 5A:
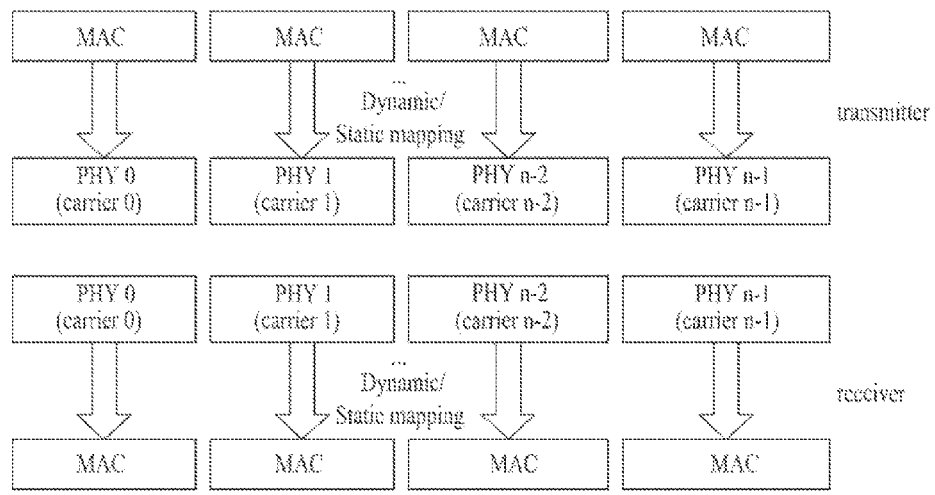
FIGS. 5A and 5B illustrate a physical layer (L1) and a MAC layer (L2)) of a multicarrier supporting system.
Figure 5B:
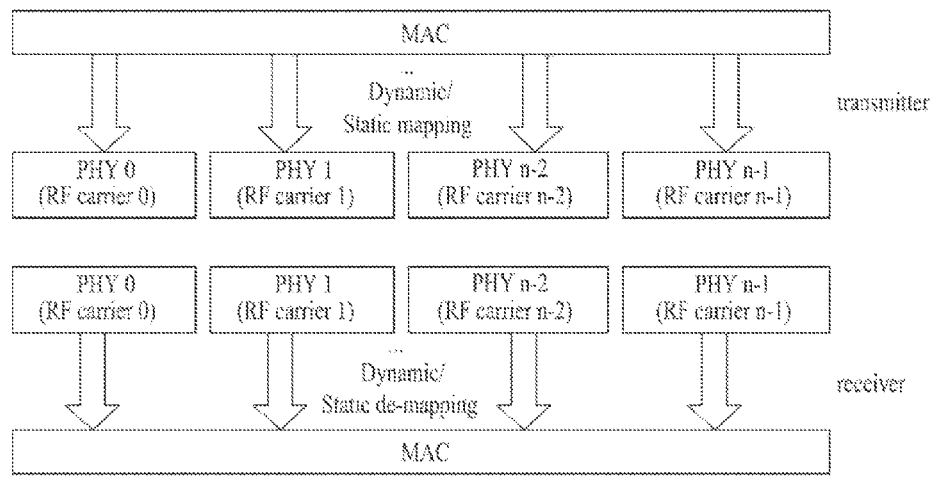

FIGS. 5A and 5B show a physical layer (first layer, L1) and a MAC layer (second layer, L2) of a multi-carrier supported system. Referring to FIGS. 5A and 5B, a BS of the legacy wireless communication system supporting a single carrier includes one physical layer (PHY) entity capable of supporting one carrier, and one medium access control (MAC) entity for controlling one PHY entity may be provided to the BS. For example, baseband processing may be carried out in the PHY layer. For example, the L1/L2 scheduler operation including not only MAC PDU (Protocol Data Unit) creation of a transmitter but also MAC/RLC sub-layers may be carried out in the MAC layer. The MAC PDU packet block of the MAC layer is converted into a transport block through a logical transport layer, such that the resultant transport block is mapped to a physical layer input information block. In FIGS. 5A and 5B, the MAC layer is represented as the entire L2 layer, and may conceptually cover MAC/RLC/PDCP sub-layers. For convenience of description and better understanding of the present invention, the above-mentioned application may be used interchangeably in the MAC layer description of the present invention.

On the other hand, a multicarrier-supporting system may provide a plurality of MAC-PHY entities. In more detail, as can be seen from FIG. 5A, the transmitter and receiver of the multicarrier-supporting system may be configured in such a manner that one MAC-PHY entity is mapped to each of n component carriers (n CCs). An independent PHY layer and an independent MAC layer are assigned to each CC, such that a PDSCH for each CC may be created in the range from the MAC PDU to the PHY layer.

Alternatively, the multicarrier-supporting system may provide one common MAC entity and a plurality of PHY entities. That is, as shown in FIG. 5B, the multicarrier-supporting system may include the transmitter and the receiver in such a manner that n PHY entities respectively correspond to n CCs and one common MAC entity controlling the n PHY entities may be present in each of the transmitter and the receiver. In this case, a MAC PDU from one MAC layer may be branched into a plurality of transport blocks corresponding to a plurality of CCs through a transport layer. Alternatively, when generating a MAC PDU in the MAC layer or when generating an RLC PDU in the RLC layer, the MAC PDU or RLC PDU may be branched into individual CCs. As a result, a PDSCH for each CC may be generated in the PHY layer.

PDCCH for transmitting L1/L2 control signaling control information generated from a packet scheduler of the MAC layer may be mapped to physical resources for each CC, and then transmitted. In this case, PDCCH that includes control information (DL assignment or UL grant) for transmitting PDSCH or PUSCH to a specific UE may be separately encoded at every CC carrying the corresponding PDSCH/PUSCH. The PDCCH may be called a separate coded PDCCH. On the other hand, PDSCH/PUSCH transmission control information of several CCs may be configured in one PDCCH such that the configured PDCCH may be transmitted. This PDCCH may be called a joint coded PDCCH.

To support carrier aggregation, connection between a BS and a UE (or RN) needs to be established and preparation of connection setup between the BS and the UE is needed in such a manner that a control channel (PDCCH or PUCCH) and/or a shared channel (PDSCH or PUSCH) can be transmitted. In order to perform the above-mentioned connection or connection setup for a specific UE or RN, measurement and/or reporting for each carrier are needed, and CCs serving as the measurement and/or reporting targets may be assigned. In other words, CC assignment means that CCs (indicating the number of CCs and indexes of CCs) used for DL/UL transmission are established in consideration of not only capabilities of a specific UE (or RN) from among UL/DL CCs constructed in the BS but also system environment.

In this case, when CC assignment is controlled in third layer (L3) Radio Resource Management (RRM), UE-specific or RN-specific RRC signaling may be used. Alternatively, cell-specific or cell cluster-specific RRC signaling may be used. Provided that dynamic control such as a series of CC activation/deactivation settings is needed for CC assignment, a predetermined PDCCH may be used for L1/L2 control signaling, or a dedicated physical control channel for CC assignment control information or an L2 MAC-message formatted PDSCH may be used. On the other hand, if CC assignment is controlled by a packet scheduler, a predetermined PDCCH may be used for L1/L2 control signaling, a physical control channel dedicated for CC assignment control information may be used, or a PDSCH configured in the form of an L2 MAC message may be used.

FIG. 6 is a conceptual diagram illustrating downlink (DL) and uplink (UL) component carriers (CCs). Referring to FIG. 6, DL and UL CCs may be assigned from a BS (cell) or RN. For example, the number of DL CCs may be set to N and the number of UL CCs may be set to M.

Through the UE's initial access or initial deployment process, after RRC connection is established on the basis of one certain CC for DL or UL (cell search) (for example, system information acquisition/reception, initial random access process, etc.), a unique carrier setup for each UE may be provided from a dedicated signaling (UE-specific RRC signaling or UE-specific L1/L2 PDCCH signaling). For example, assuming that a carrier setup for UE is commonly achieved in units of a BS (cell or cell-cluster), the UE carrier setup may also be provided through cell-specific RRC signaling or cell-specific UE-common L1/L2 PDCCH signaling. In another example, carrier component information for use in a BS may be signaled to a UE through system information for RRC connection setup, or may also be signaled to additional system information or cell-specific RRC signaling upon completion of the RRC connection setup.

While DL/UL CC setup has been described, centering on the relationship between a BS and a UE, to which the present invention is not limited, an RN may also provide DL/UL CC setup to a UE contained in an RN region. In addition, in association with an RN contained in a BS region, the BS may also provide DL/UL CC setup of the corresponding RN to the RN of the BS region. For clarity, while the following description will disclose DL/UL CC setup on the basis of the relationship between the BS and the UE, it should be noted that the same content may also be applied to the relationship between the RN and the UE (i.e., access uplink and downlink) or the relation between the BS and the RN (backhaul uplink or downlink) without departing from the scope or spirit of the present invention.

When the above-mentioned DL/UL CCs are uniquely assigned to individual UEs, DL/UL CC linkage may be implicitly or explicitly configured through a certain signaling parameter definition.

Figure 7:
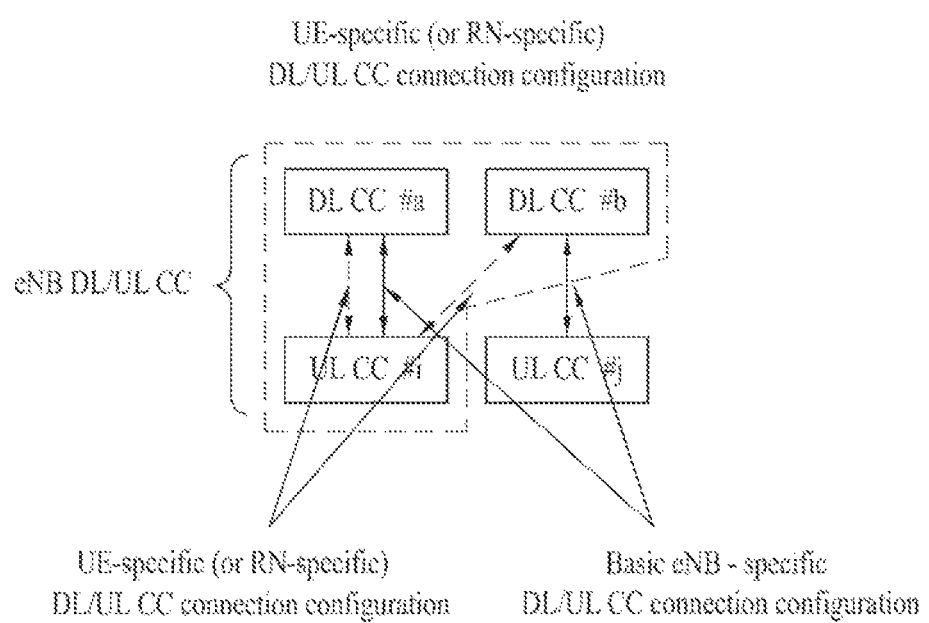
FIG. 7 illustrates an example of DL/UL CC connection.

FIG. 7 shows an exemplary linkage of DL/UL CCs. In more detail, when a BS configures two DL CCs (DL CC #a and DL CC #b) and two UL CCs (UL CC #i and UL CC #j), FIG. 7 shows a DL/UL CC linkage defined when two DL CCs (DL CC #a and DL CC #b) and one UL CC (UL CC #i) are assigned to a certain UE. In a DL/UL CC linkage setup shown in FIG. 7, a solid line indicates a linkage setup between DL CC and UL CC that are basically constructed by a BS, and this linkage setup between DL CC and UL CC may be defined in "System Information Block (SIB) 2". In the DL/UL CC linkage setup shown in FIG. 7, a dotted line indicates a linkage setup between DL CC and UL CC configured in a specific UE. The above-mentioned DL CC and UL CC linkage setup shown in FIG. 7 is disclosed only for illustrative purposes, and the scope or spirit of the present invention is not limited thereto. That is, in accordance with various embodiments of the present invention, the number of DL CCs or UL CCs configured by a BS may be set to an arbitrary number. Thus, the number of UE-specific DL CCs or the number of UE-specific UL CCs in the above-mentioned DL CCs or UL CCs may be set to an arbitrary number, and associated DL/UL CC linkage may be defined in a different way from that of FIG. 7.

Further, from among DL CCs and UL CCs configured or assigned, a primary CC (PCC), or a primary cell (P-cell) or an anchor CC (also called an anchor cell) may be configured. For example, a DL PCC (or DL P-cell) aiming to transmit configuration/reconfiguration information on RRC connection setup may be configured. In another example, UL CC for transmitting PUCCH to be used when a certain UE transmits UCI that must be transmitted on uplink may be configured as UL PCC (or UL P-cell). For convenience of description, it is assumed that one DL PCC (P-cell) and one UL PCC (P-cell) are basically assigned to each UE. Alternatively, if a large number of CCs is assigned to UE or if CCs can be assigned from a plurality of BSs, one or more DL PCCs (P-cells) and/or one or more UL PCCs (P-cells) may be assigned from one or more BSs to a certain UE. For linkage between DL PCC (P-cell) and UL PCC (P-cell), a UE-specific configuration method may be considered by the BS as necessary. To implement a more simplified method, a linkage between DL PCC (P-cell) and UL PCC (P-cell) may be configured on the basis of the relationship of basic linkage that has been defined in LTE Release-8 (LTE Rel-8) and signaled to System Information Block (or Base) 2. DL PCC (P-cell) and UL PCC (P-cell) for the above-mentioned linkage configuration are grouped so that the grouped result may be denoted by a UE-specific P-cell.

SC-FDMA Transmission and OFDMA Transmission

Figure 8:
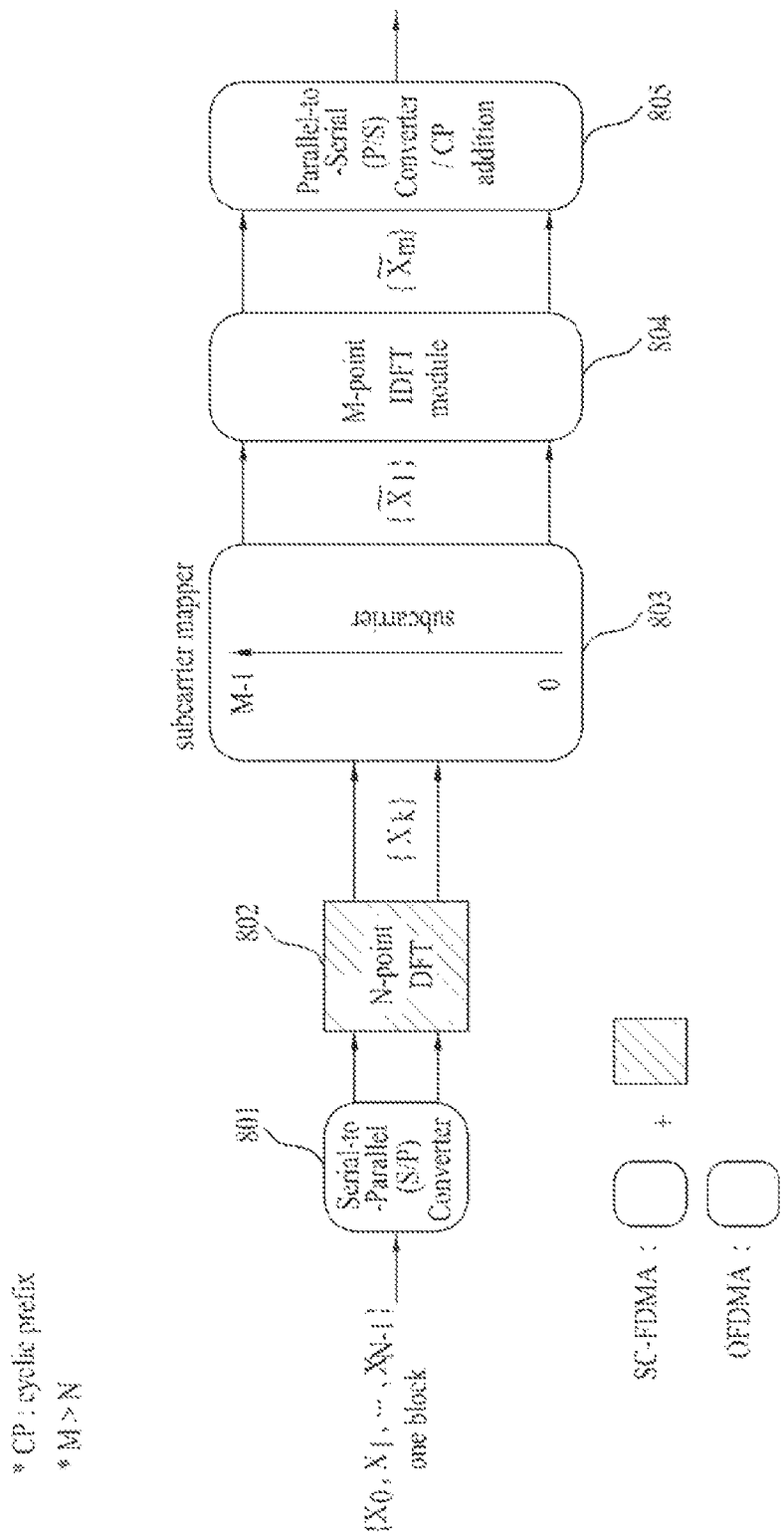
FIG. 8 illustrates SC-FDMA and OFDMA transmission schemes.

FIG. 8 is a conceptual diagram illustrating an SC-FDMA transmission scheme and an OFDMA transmission scheme for use in a mobile communication system. The SC-FDMA transmission scheme may be used for UL transmission and the OFDMA transmission scheme may be used for DL transmission.

Each of the UL signal transmission entity (e.g., UE) and the DL signal transmission entity (e.g., BS) may include a Serial-to-Parallel (S/P) Converter 801, a subcarrier mapper 803, an M-point Inverse Discrete Fourier Transform (IDFT) module 804, and a Parallel-to-Serial Converter 805. Each input signal that is input to the S/P converter 801 may be a channel coded and modulated data symbol. However, a user equipment (UE) for transmitting signals according to the SC-FDMA scheme may further include an N-point Discrete Fourier Transform (DFT) module 802. The influence of IDFT processing of the M-point IDFT module 804 is considerably offset, such that a transmission signal may be designed to have a single carrier property. That is, the DFT module 802 performs DFT spreading of an input data symbol such that a single carrier property requisite for UL transmission may be satisfied. The SC-FDMA transmission scheme basically provides good or superior Peak to Average Power ratio (PAPR) or Cubic Metric (CM), such that the UL transmitter can more effectively transmit data or information even in the case of the power limitation situation, resulting in an increase in user throughput.

Figure 9A:
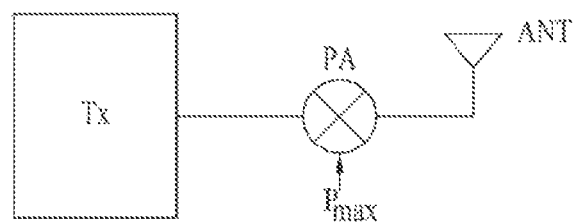
FIGS. 9A to 9C illustrate maximum transmit power in the case of single antenna transmission and multi-antenna transmission.
Figure 9B:
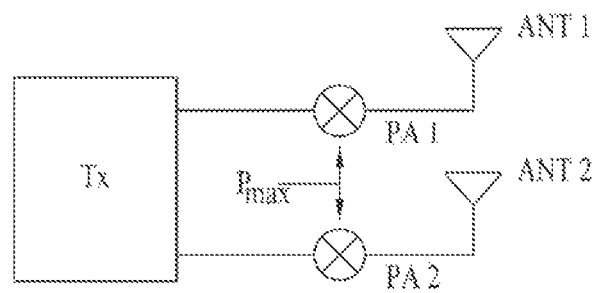
Figure 9C:
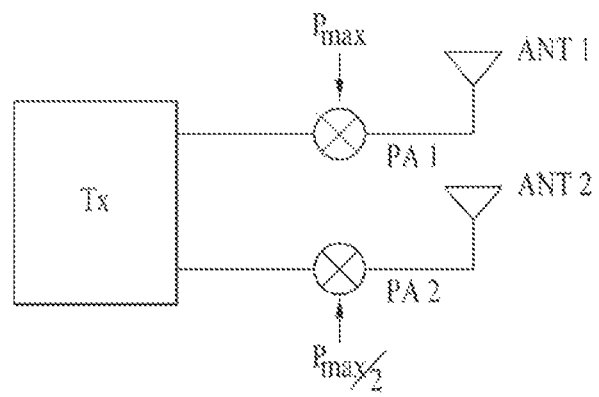

FIGS. 9A to 9C are conceptual diagrams illustrating maximum transmission power for single antenna transmission and MIMO transmission. FIG. 9A shows the case of single antenna transmission. As can be seen from FIG. 9A, one power amplifier (PA) may be provided to one antenna. In FIG. 9A, an output signal ($P_{max}$) of the power amplifier (PA) may have a specific value, for example, 23 dBm. In contrast, FIGS. 9B and 9C show the case of MIMO transmission. As can be seen from FIGS. 9B and 9C, several PAs may be mapped to respective transmission (Tx) antennas. For example, provided that the number of transmission (Tx) antennas is set to 2, 2 PAs may be mapped to respective transmission (Tx) antennas. The setting of output values (i.e., maximum transmission power) of 2 PAs may be configured in different ways as shown in FIGS. 9B and 9C.

In FIG. 9B, maximum transmission power ($P_{max}$) for single antenna transmission may be divisionally applied to PA1 and PA2. That is, if a transmission power value of x [dBm] is assigned to PA1, a transmission power value of ($P_{max}$-x) [dBm] may be applied to PA2. In this case, since total transmission power ($P_{max}$) is maintained, the transmitter may have higher robustness against the increasing PAPR in the power limitation situation.

On the other hand, as can be seen from FIG. 9C, only one Tx antenna (ANT1) may have a maximum transmission power value ($P_{max}$), and the other Tx antenna (ANT2) may have a half value ($P_{max}/2$) of the maximum transmission power value ($P_{max}$). In this case, only one transmission antenna may have higher robustness against increasing PAPR.

MIMO System

MIMO technology is not dependent on one antenna path to receive a message, collects a plurality of data pieces received via several antennas, and completes total data. As a result, MIMO technology can increase a data transfer rate within a specific range, or can increase a system range at a specific data transfer rate. Under this situation, MIMO technology is a next-generation mobile communication technology capable of being widely applied to mobile communication terminals or RNs. MIMO technology can extend the range of data communication, so that it can overcome the limited amount of transmission (Tx) data of mobile communication systems reaching a critical situation.

Figure 10A:
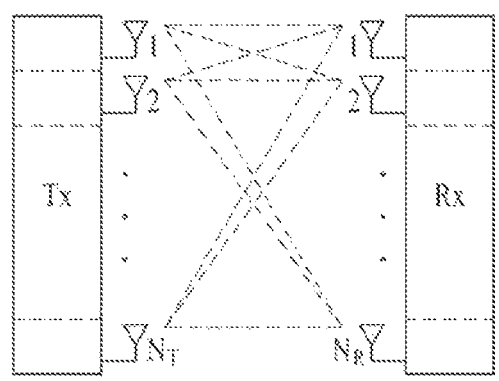
FIGS. 10A and 10B show a configuration of a MIMO communication system.

FIG. 10A shows the configuration of a general MIMO communication system. Referring to FIG. 10A, if the number of transmit (Tx) antennas increases to $N_T$, and at the same time the number of receive (Rx) antennas increases to $N_R$, a theoretical channel transmission capacity of the MIMO communication system increases in proportion to the number of antennas, differently from the above-mentioned case in which only a transmitter or receiver uses several antennas, so that transfer rate and frequency efficiency can be greatly increased. In this case, the transfer rate acquired by the increasing channel transmission capacity can theoretically increase by a predetermined amount that corresponds to multiplication of a maximum transfer rate ($R_o$) acquired when one antenna is used and a rate of increase ($R_i$). The rate of increase ($R_i$) can be represented by the following equation 1.

$$R_i = \min(N_T, N_R) \quad \text{[Equation 1]}$$

For example, provided that a MIMO system uses four transmit (Tx) antennas and four receive (Rx) antennas, the MIMO system can theoretically acquire a high transfer rate which is four times higher than that of a single antenna system. After the above-mentioned theoretical capacity increase of the MIMO system was demonstrated in the mid-1990s, many developers began to conduct intensive research into a variety of technologies which can substantially increase data transfer rate using the theoretical capacity increase. Some of the above technologies have been reflected in a variety of wireless communication standards, for example, third-generation mobile communication or next-generation wireless LAN, etc.

A variety of MIMO-associated technologies have been intensively researched by many companies or developers, for example, research into information theory associated with MIMO communication capacity under various channel environments or multiple access environments, research into a radio frequency (RF) channel measurement and modeling of the MIMO system, and research into a space-time signal processing technology.

Mathematical modeling of a communication method for use in the above-mentioned MIMO system will hereinafter be described in detail. As can be seen from FIG. 10A, it is assumed that there are $N_T$ transmit (Tx) antennas and $N_R$ receive (Rx) antennas. In the case of a transmission (Tx) signal, a maximum number of transmission information pieces is $N_T$ under the condition that $N_T$ transmit (Tx) antennas are used, so that the transmission (Tx) information can be represented by a specific vector shown in the following equation 2.

$$s = [s_1, s_2, \ldots, s_{N_T}]^T \quad \text{[Equation 2]}$$

In the meantime, individual transmission (Tx) information pieces ($s_1, s_2, \ldots, s_{N_T}$) may have different transmission powers. In this case, if the individual transmission powers are denoted by ($P_1, P_2, \ldots, P_{N_T}$), transmission (Tx) information having an adjusted transmission power can be represented by a specific vector shown in the following equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In Equation 3, $\hat{s}$ is a transmission vector, and can be represented by the following equation 4 using a diagonal matrix P of a transmission (Tx) power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

In the meantime, the information vector $\hat{s}$ having an adjusted transmission power is applied to a weight matrix (W), so that $N_T$ transmission (Tx) signals ($x_1, x_2, \ldots, x_{N_T}$) to be actually transmitted are configured. In this case, the weight matrix (W) is adapted to properly distribute transmission (Tx) information to individual antennas according to transmission channel situations. The above-mentioned transmission (Tx) signals ($x_1, x_2, \ldots, x_{N_T}$) can be represented by the following equation 5 using the vector (X).

$$x = \begin{bmatrix} x_1 \\ x_2 \\ \vdots \\ x_i \\ \vdots \\ x_{N_T} \end{bmatrix} \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Next, if $N_R$ receive (Rx) antennas are used, reception (Rx) signals ($y_1, y_2, \ldots, y_{NR}$) of individual antennas can be represented by a specific vector (y) shown in the following equation 6.

$$y = [y_1, y_2, \ldots, y_{N_R}]^T \quad \text{[Equation 6]}$$

In the meantime, if a channel modeling is executed in the MIMO communication system, individual channels can be distinguished from each other according to transmit/receive (Tx/Rx) antenna indexes. A specific channel passing the range from a transmit (Tx) antenna (j) to a receive (Rx) antenna (i) is denoted by $h_{ij}$. In this case, it should be noted that the index order of the channel $h_{ij}$ is located before a receive (Rx) antenna index and is located after a transmit (Tx) antenna index.

Figure 10B:
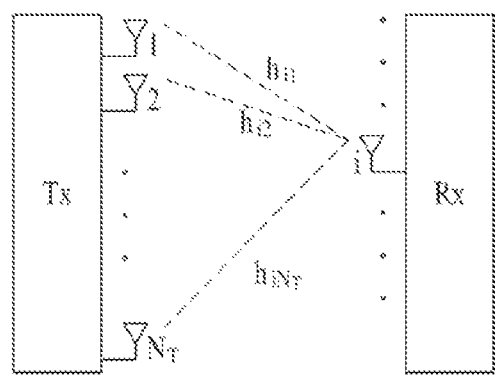

Several channels are tied up, so that they are displayed in the form of a vector or matrix. An exemplary vector is as follows. FIG. 10B shows channels from $N_T$ transmit (Tx) antennas to a receive (Rx) antenna (i).

Referring to FIG. 10B, the channels passing the range from the $N_T$ transmit (Tx) antennas to the receive (Rx) antenna (i) can be represented by the following equation 7.

$$h_i^T = [h_{i1}, h_{i2}, \ldots, h_{iN_T}] \quad \text{[Equation 7]}$$

If all channels passing the range from the $N_T$ transmit (Tx) antennas to $N_R$ receive (Rx) antennas are denoted by the matrix shown in Equation 7, the following equation 8 is acquired.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \quad \text{[Equation 8]}$$

Additive white Gaussian noise (AWGN) is added to an actual channel which has passed the channel matrix (H) shown in Equation 8. The AWGN ($n_1, n_2, \ldots, n_{NR}$) added to each of $N_R$ receive (Rx) antennas can be represented by a specific vector shown in the following equation 9.

$$n = [n_1, n_2, \ldots, n_{N_R}]^T \quad \text{[Equation 9]}$$

A reception signal calculated by the above-mentioned equations can be represented by the following equation 10.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

In the meantime, the number of rows and the number of columns of a channel matrix H indicating a channel condition are determined by the number of Tx/Rx antennas. In the channel matrix H, the number of rows is equal to the number ($N_R$) of Rx antennas, and the number of columns is equal to the number ($N_T$) of Tx antennas. Namely, the channel matrix H is denoted by an $N_R \times N_T$ matrix. Generally, a matrix rank is defined by a smaller number between the number of rows and the number of columns, in which the rows and the columns are independent of each other. Therefore, the matrix rank cannot be higher than the number of rows or columns. The rank of the channel matrix H can be represented by the following equation 11.

$$\text{rank}(H) \leq \min(N_T, N_R) \quad \text{[Equation 11]}$$

A variety of MIMO transmission/reception (Tx/Rx) schemes may be used for operating the MIMO system, for example, frequency switched transmit diversity (FSTD), Space Frequency Block Coding (SFBC), Space Time Block Coding (STBC), Cyclic Delay Diversity (CDD), time switched transmit diversity (TSTD), etc. In case of Rank 2 or higher, Spatial Multiplexing (SM), Generalized Cyclic Delay Diversity (GCDD), Selective Virtual Antenna Permutation (S-VAP), etc. may be used.

The FSTD scheme serves to allocate subcarriers having different frequencies to signals transmitted through multiple antennas so as to obtain diversity gain. The SFBC scheme efficiently applies selectivity of a spatial region and a frequency region so as to obtain diversity gain and multiuser scheduling gain. The STBC scheme applies selectivity of a spatial domain and a time region. The CDD scheme serves to obtain diversity gain using path delay between transmit antennas. The TSTD scheme serves to temporally divide signals transmitted through multiple antennas. The spatial multiplexing scheme serves to transmit different data through different antennas so as to increase a transfer rate. The GCDD scheme serves to apply selectivity of a time region and a frequency region. The S-VAP scheme uses a single precoding matrix and includes a Multi Codeword (MCW) S-VAP for mixing multiple codewords among antennas in spatial diversity or spatial multiplexing and a Single Codeword (SCW) S-VAP using a single codeword.

In case of the STBC scheme from among the above-mentioned MIMO transmission schemes, the same data symbol is repeated to support orthogonality in a time domain so that time diversity can be obtained. Similarly, the SFBC scheme enables the same data symbol to be repeated to support orthogonality in a frequency domain so that frequency diversity can be obtained. An exemplary time block code used for STBC and an exemplary frequency block code used for SFBC are shown in Equation 12 and Equation 13, respectively. Equation 12 shows a block code of the case of 2 transmit (Tx) antennas, and Equation 13 shows a block code of the case of 4 transmit (Tx) antennas.

$$\frac{1}{\sqrt{2}}\begin{pmatrix} S_1 & S_2 \\ -S_2^* & S_1^* \end{pmatrix}$$ [Equation 12]

$$\frac{1}{\sqrt{2}}\begin{pmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{pmatrix}$$ [Equation 13]

In Equations 12 and 13, $S_i$ (i=1, 2, 3, 4) means a modulated data symbol. In addition, each row of the matrixes of Equation 12 and 13 may indicate an antenna port, and each column may indicate time (in case of STBC) or frequency (in case of SFBC).

Figure 11A:
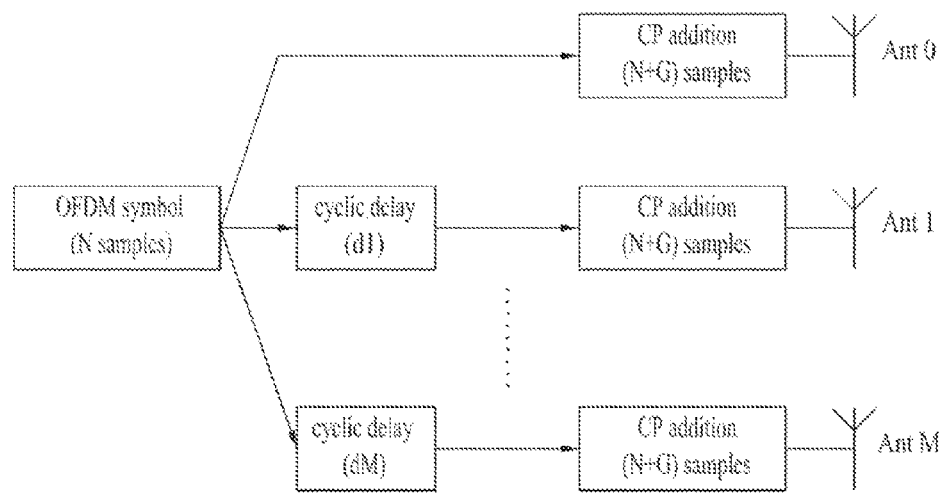
FIGS. 11A and 11B show a normal CCD structure in a MIMO system.
Figure 11B:
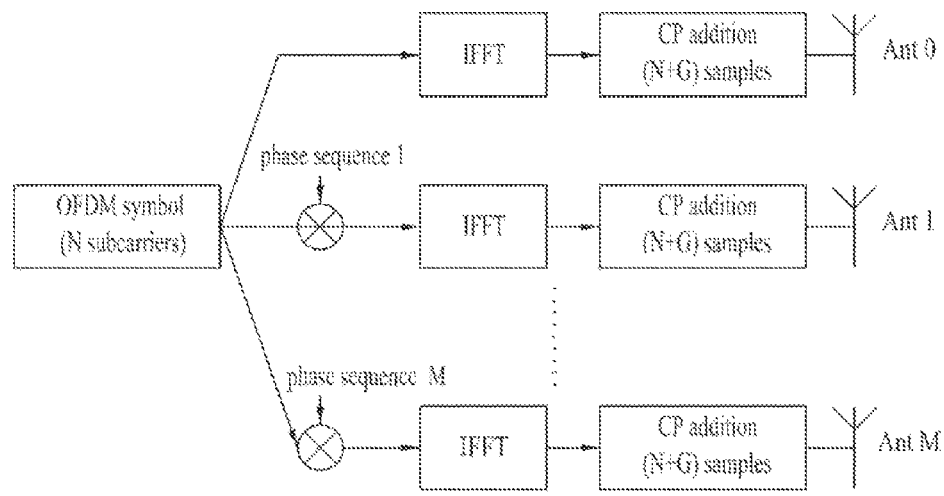

On the other hand, the CDD scheme from among the above-mentioned MIMO transmission schemes mandatorily increases delay spread so as to increase frequency diversity. FIGS. 11A and 11B are conceptual diagrams illustrating a general CDD structure for use in the MIMO system. FIG. 11A shows a method for applying cyclic delay to a time domain. If necessary, the CDD scheme based on the cyclic delay of FIG. 11A may also be implemented as phase-shift diversity of FIG. 11B.

Figure 12:
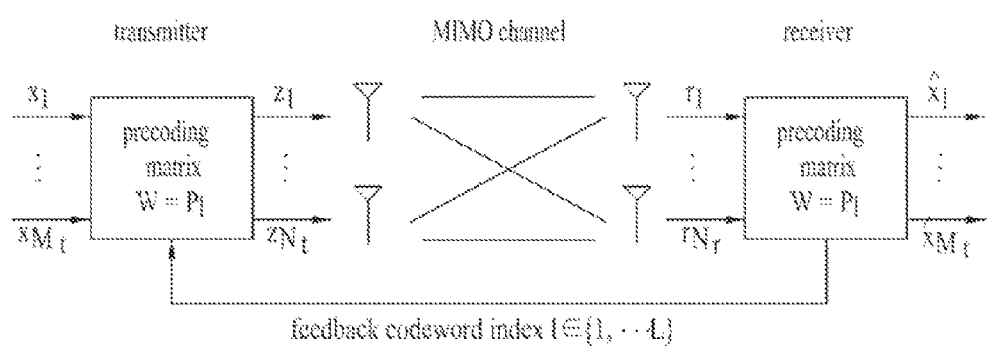
FIG. 12 is a diagram for illustrating codebook based precoding.

In association with the above-mentioned MIMO transmission techniques, the codebook-based precoding method will hereinafter be described with reference to FIG. 12. FIG. 12 is a conceptual diagram illustrating codebook-based precoding.

In accordance with the codebook-based precoding scheme, a transceiver may share codebook information including a predetermined number of precoding matrixes according to a transmission rank, the number of antennas, etc. That is, if feedback information is finite, the precoding-based codebook scheme may be used. The receiver measures a channel state through a reception signal, so that a finite number of preferred precoding matrix information (i.e., an index of the corresponding precoding matrix) may be fed back to the transmitter on the basis of the above-mentioned codebook information. For example, the receiver may select an optimum precoding matrix by measuring an ML (Maximum Likelihood) or MMSE (Minimum Mean Square Error) scheme. Although the receiver shown in FIG. 12 transmits precoding matrix information for each codeword to the transmitter, the scope or spirit of the present invention is not limited thereto.

Upon receiving feedback information from the receiver, the transmitter may select a specific precoding matrix from a codebook on the basis of the received information. The transmitter that has selected the precoding matrix performs a precoding operation by multiplying the selected precoding matrix by as many layer signals as the number of transmission ranks, and may transmit each precoded Tx signal over a plurality of antennas.

If the receiver receives the precoded signal from the transmitter as an input, it performs inverse processing of the precoding having been conducted in the transmitter so that it can recover the reception (Rx) signal. Generally, the precoding matrix satisfies a unitary matrix (U) such as ($U*U^H$=I), so that the inverse processing of the above-mentioned precoding may be conducted by multiplying a Hermit matrix ($P^H$) of the precoding matrix H used in the precoding of the transmitter by the reception (Rx) signal.

Physical Uplink Control Channel (PUCCH)

PUCCH including UL control information will hereinafter be described in detail.

A plurality of UE control information pieces may be transmitted through a PUCCH. When Code Division Multiplexing (CDM) is performed in order to discriminate signals of UEs, a Constant Amplitude Zero Autocorrelation (CAZAC) sequence having a length of 12 is mainly used. Since the CAZAC sequence has a property that a constant amplitude is maintained in a time domain and a frequency domain, a Peak-to-Average Power Ratio (PAPR) of a UE or Cubic Metric (CM) may be decreased to increase coverage. In addition, ACK/NACK information for DL data transmitted through the PUCCH may be covered using an orthogonal sequence.

In addition, control information transmitted through the PUCCH may be discriminated using cyclically shifted sequences having different cyclic shift values. A cyclically shifted sequence may be generated by cyclically shifting a basic sequence (also called a base sequence) by a specific cyclic shift (CS) amount. The specific CS amount is indicated by a CS index. The number of available CSs may be changed according to channel delay spread. Various sequences may be used as the basic sequence and examples thereof include the above-described CAZAC sequence.

PUCCH may include a variety of control information, for example, a Scheduling Request (SR), DL channel measurement information, and ACK/NACK information for DL data transmission. The channel measurement information may include Channel Quality Indicator (CQI), a Precoding Matrix Index (PMI), and a Rank Indicator (RI).

PUCCH format may be defined according to the type of control information contained in a PUCCH, modulation scheme information thereof, etc. That is, PUCCH format 1 may be used for SR transmission, PUCCH format 1a or 1b may be used for HARQ ACK/NACK transmission, PUCCH format 2 may be used for CQI transmission, and PUCCH format 2a/2b may be used for HARQ ACK/NACK transmission.

If HARQ ACK/NACK is transmitted alone in an arbitrary subframe, PUCCH format 1a or 1b may be used. If SR is transmitted alone, PUCCH format 1 may be used. The UE may transmit the HARQ ACK/NACK and the SR through the same subframe, and a detailed description thereof will hereinafter be described in detail.

PUCCH format may be summarized as shown in Table 1.

TABLE 1

| PUCCH format | Modulation scheme | Number of bits per subframe | Usage | etc. |
| --- | --- | --- | --- | --- |
| 1 | N/A | N/A | SR(Scheduling Request) | |
| 1a | BPSK | 1 | ACK/NACK | One codeword |
| 1b | QPSK | 2 | ACK/NACK | Two codeword |
| 2 | QPSK | 20 | CQI | Joint Coding ACK/NACK (extended CP) |
| 2a | QPSK + BPSK | 21 | CQI + ACK/NACK | Normal CP only |
| 2b | QPSK + BPSK | 22 | CQI + ACK/NACK | Normal CP only |

Figure 13:
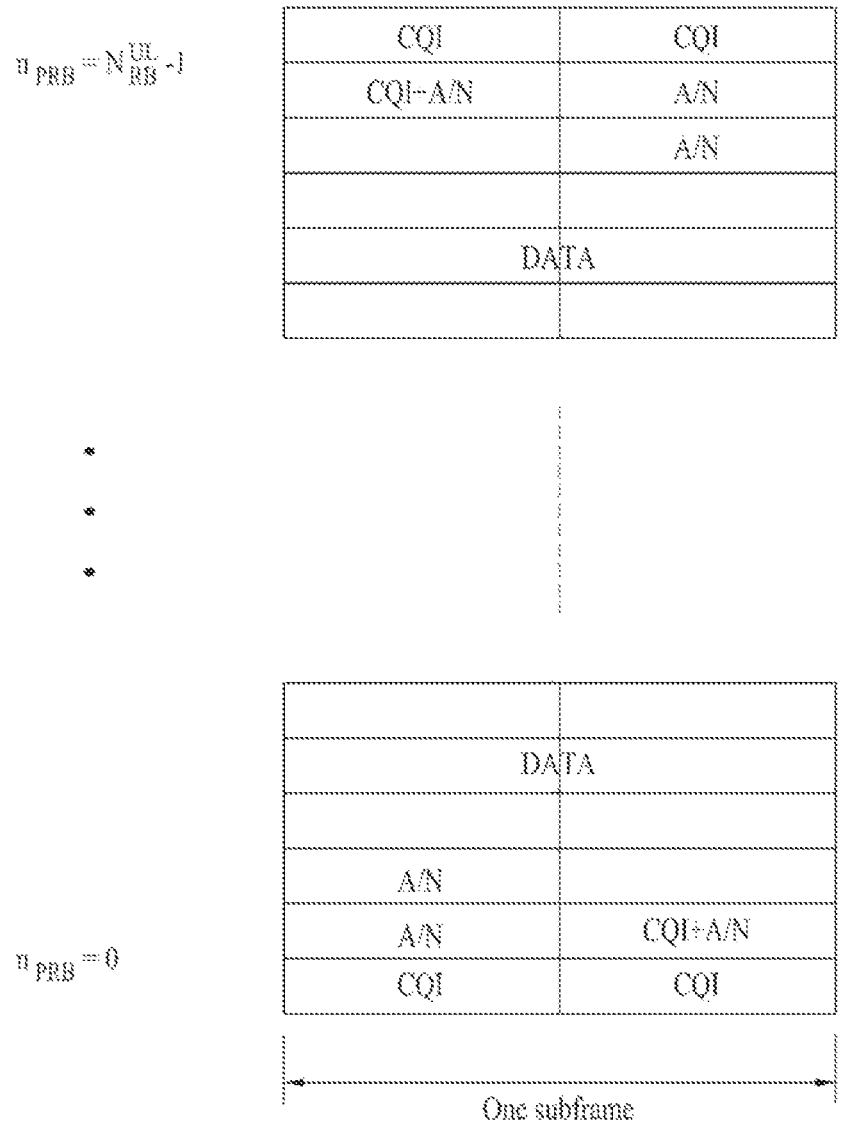
FIG. 13 illustrates a resource mapping structure of a PUCCH.

FIG. 13 shows a PUCCH resource mapping structure for use in a UL physical resource block (PRB). $N_{RB}^{UL}$ is the number of resource blocks (RBs) for use in uplink (UL), and $n_{PRB}$ is a physical resource block (PRB) number. PUCCH may be mapped to both edges of a UL frequency block. CQI resources may be mapped to a PRB located just after the edge of a frequency band, and ACK/NACK may be mapped to this PRB.

PUCCH format 1 is a control channel used for SR transmission. SR (Scheduling Request) may be transmitted in such a manner that SR is requested or not requested.

PUCCH format 1a/1b is a control channel used for ACK/NACK transmission. In the PUCCH format 1a/1b, a symbol modulated using the BPSK or QPSK modulation scheme is multiplied by a CAZAC sequence of length 12. Upon completion of the CAZAC sequence multiplication, the resultant symbol is blockwise-spread as an orthogonal sequence. A Hadamard sequence of length 4 is applied to general ACK/NACK information, and a DFT (Discrete Fourier Transform) sequence of length 3 is applied to shortened ACK/NACK information and a reference signal (or reference symbol; RS). A Hadamard sequence of length 2 may be applied to the reference signal for the extended CP.

The UE may also transmit HARQ ACK/NACK and SR through the same subframe. For positive SR transmission, the UE may transmit HARQ ACK/NACK information through resources allocated for the SR. For negative SR transmission, the UE may transmit HARQ ACK/NACK information through resources allocated for ACK/NACK information.

PUCCH format 2/2a/2b will hereinafter be described in detail. PUCCH format 2/2a/2b is a control channel for transmitting channel measurement feedback (CQI, PMI, RI).

The PUCCH format 2/2a/2b may support modulation based on a CAZAC sequence, and a QPSK-modulated symbol may be multiplied by a CAZAC sequence of length 12. Cyclic shift (CS) of the sequence may be changed between a symbol and a slot. For a reference signal (RS), orthogonal covering may be used.

FIG. 14 shows a channel structure of a CQI bit. The CQI bit may include one or more fields. For example, the CQI bit may include a CQI field indicating a CQI index for MCS decision, a PMI field indicating an index of a precoding matrix of a codebook, and an RI field indicating rank.

Figure 14A:
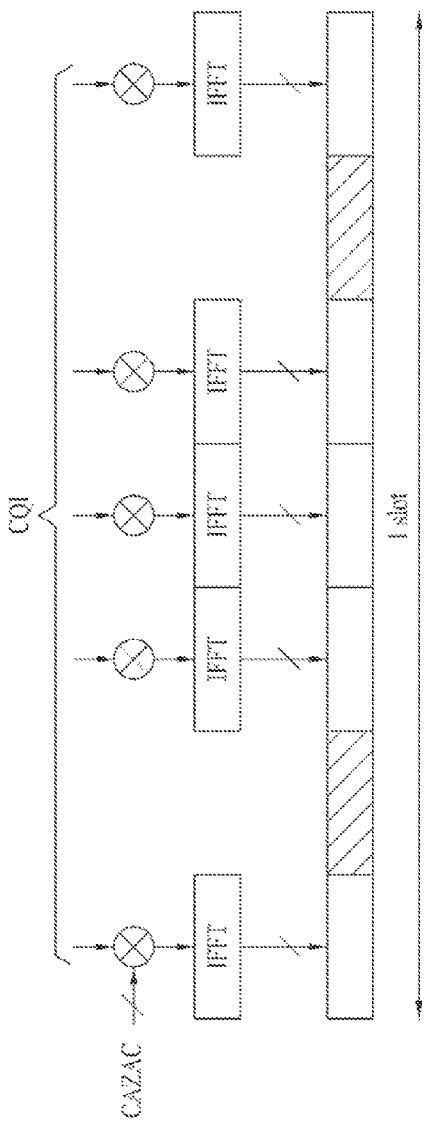
FIGS. 14A and 14B illustrate channel structures of CQI bits.

Referring to FIG. 14A, a reference signal (RS) may be loaded on two SC-FDMA symbols spaced apart from each other by a predetermined distance corresponding to 3 SC-FDMA symbol intervals from among 7 SC-FDMA symbols contained in one slot, and CQI may be loaded on the remaining 5 SC-FDMA symbols. The reason why two RSs may be used in one slot is to support a high-speed UE. In addition, each UE may be discriminated by a sequence. CQI symbols may be modulated in the entire SC-FDMA symbol, and the modulated CQI symbols may then be transmitted. The SC-FDMA symbol is composed of one sequence. That is, a UE performs CQI modulation using each sequence, and transmits the modulated result.

The number of symbols that can be transmitted during one TTI is set to 10, and CQI modulation is extended up to QPSK. If QPSK mapping is applied to the SC-FDMA symbol, a CQI value of 2 bits may be loaded on the SC-FDMA symbol, so that a CQI value of 10 bits may be assigned to one slot. Therefore, a maximum of 20-bit CQI value may be assigned to one subframe. A frequency domain spreading code may be used to spread CQI in a frequency domain.

CAZAC sequence (for example, a ZC sequence) may be used as a frequency domain spread code. In addition, another sequence having superior correlation characteristics may be used as the frequency domain spread code. Specifically, CAZAC sequences having different cyclic shift (CS) values may be applied to respective control channels, such that the CAZAC sequences may be distinguished from one another. IFFT may be applied to the frequency domain spread CQI.

Figure 14B:
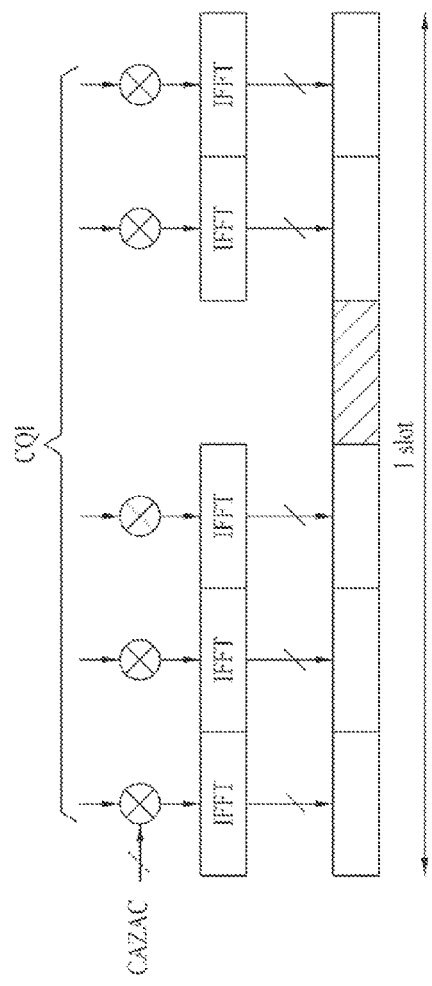

FIG. 14B shows the example of PUCCH format 2/2a/2b transmission in case of the extended CP. One slot includes 6 SC-FDMA symbols. RS is assigned to one OFDM symbol from among 6 OFDM symbols of each slot, and a CQI bit may be assigned to the remaining 5 OFDM symbols. Except for the six SC-FDMA symbols, the example of the normal CP of FIG. 14A may be used without change.

Orthogonal covering applied to the RS of FIGS. 14A and 14B is shown in Table 2.

TABLE 2

| Normal CP | Extended CP |
| --- | --- |
| [1 1] | [1] |

Figure 15:
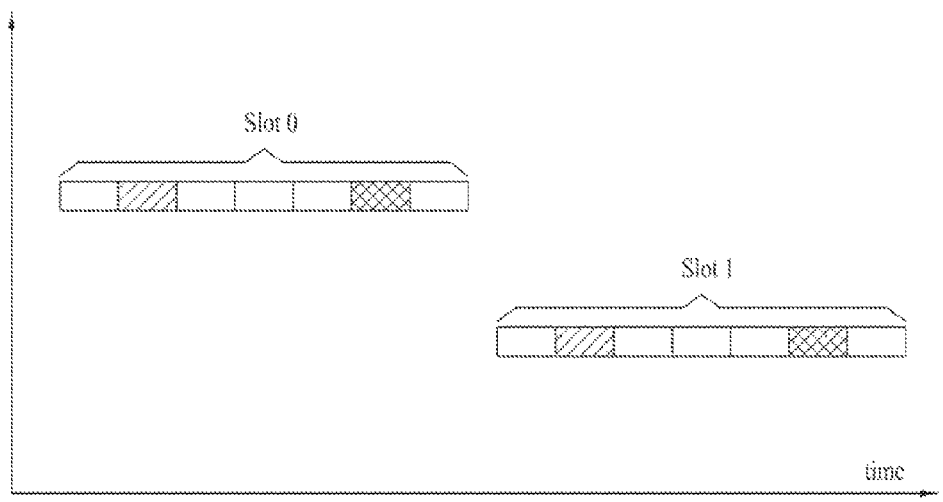
FIG. 15 is a diagram for illustrating transmission of CQI and ACK/NACK information.

Simultaneous transmission of CQI and ACK/NACK information will hereinafter be described with reference to FIG. 15.

In case of the normal CP, CQI and ACK/NACK information can be simultaneously transmitted using PUCCH format 2a/2b. ACK/NACK information may be transmitted through a symbol where CQI RS is transmitted. That is, a second RS for use in the normal CP may be modulated into an ACK/NACK symbol. In the case where the ACK/NACK symbol is modulated using the BPSK scheme as shown in the PUCCH format 1a, CQI RS may be modulated into the ACK/NACK symbol according to the BPSK scheme. In the case where the ACK/NACK symbol is modulated using the QPSK scheme as shown in the PUCCH format 1b, CQI RS may be modulated into the ACK/NACK symbol according to the QPSK scheme. On the other hand, in case of the extended CP, CQI and ACK/NACK information are simultaneously transmitted using the PUCCH format 2. For this purpose, CQI and ACK/NACK information may be joint-coded.

For details of PUCCH other than the above-mentioned description, the 3GPP standard document (e.g., 3GPP TS36.211 5.4) may be referred to, and detailed description thereof will herein be omitted for convenience of description. However, it should be noted that PUCCH contents disclosed in the above-mentioned standard document can also be applied to a PUCCH used in various embodiments of the present invention without departing from the scope or spirit of the present invention.

Channel State Information (CSI) Feedback

In order to correctly perform MIMO technology, the receiver may feed back a rank indicator (RI), a precoding matrix index (PMI) and channel quality indicator (CQI) to the transmitter. RI, PMI and CQI may be generically named Channel state Information (CSI) as necessary. Alternatively, the term "CQI" may be used as the concept of channel information including RI, PMI and CQI.

Figure 16:
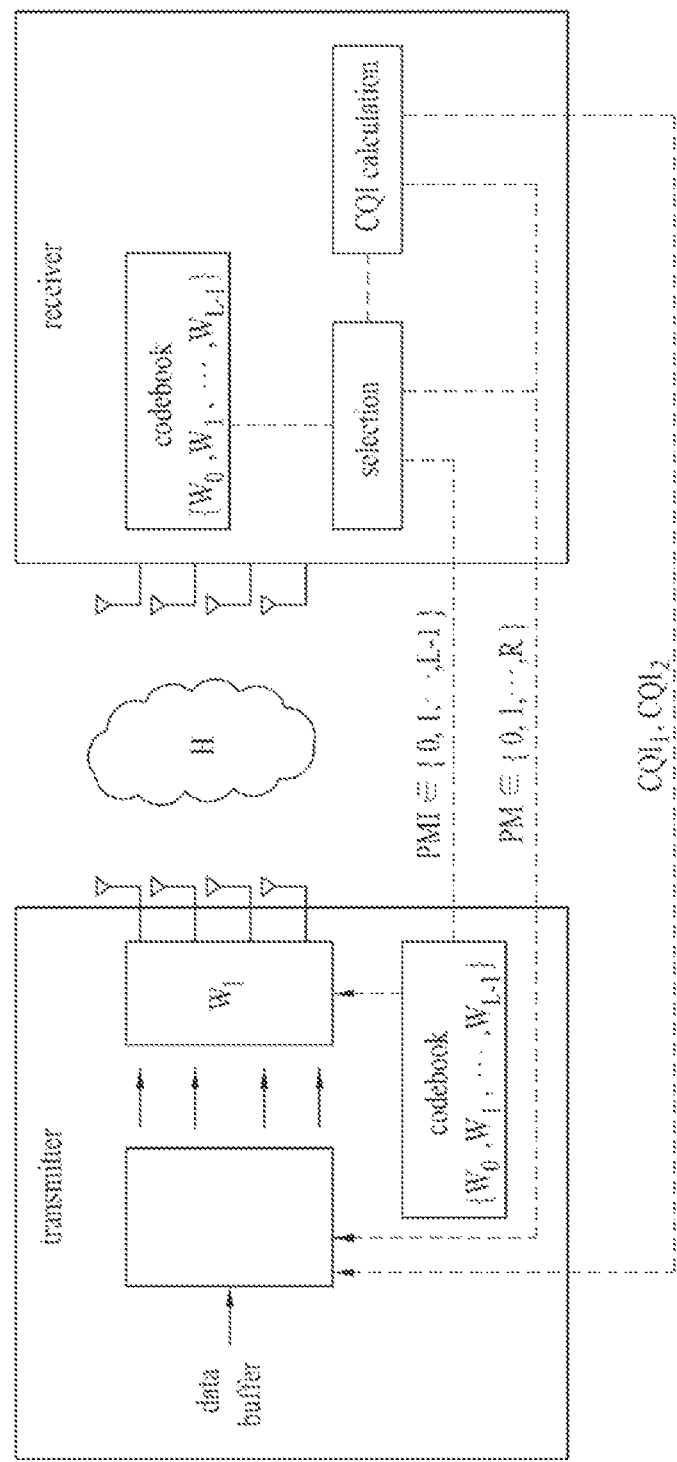
FIG. 16 is a diagram for illustrating feedback of channel state information.

FIG. 16 is a conceptual diagram illustrating a feedback of channel state information.

Referring to FIG. 16, MIMO transmission data from a transmitter may be received at a receiver over a channel (H). The receiver may select a preferred precoding matrix from a codebook on the basis of the received signal, and may feed back the selected PMI to the transmitter. In addition, the receiver may measure a Signal-to-Interference plus Noise Ratio (SINR) of the reception (Rx) signal, calculate channel quality information (CQI), and feed back the calculated CQI to the transmitter. In addition, the receiver may feed back a rank indicator (RI) of the Rx signal to the transmitter. The transmitter may determine the number of layers suitable for data transmission to the receiver and time/frequency resources, MCS (Modulation and Coding Scheme), etc. using RI and CQI fed back from the receiver. In addition, the transmitter may transmit the precoded Tx signal using the precoding matrix ($W_i$) indicated by a PMI fed back from the receiver over a plurality of antennas.

Channel state information will hereinafter be described in detail.

RI is information regarding a channel rank (i.e., the number of layers for data transmission of a transmitter). RI may be determined by the number of allocated Tx layers, and may be acquired from associated downlink control information (DCI).

PMI is information regarding a precoding matrix used for data transmission of a transmitter. The precoding matrix fed back from the receiver may be determined considering the number of layers indicated by RI. PMI may be fed back in case of closed-loop spatial multiplexing (SM) and large delay cyclic delay diversity (CDD). In the case of open-loop transmission, the transmitter may select a precoding matrix according to predetermined rules. A process for selecting a PMI for each rank (rank 1 to 4) is as follows. The receiver may calculate a post processing SINR in each PMI, convert the calculated SINR into the sum capacity, and select the best PMI on the basis of the sum capacity. That is, PMI calculation of the receiver may be considered to be a process for searching for an optimum PMI on the basis of the sum capacity. The transmitter that has received PMI feedback from the receiver may use a precoding matrix recommended by the receiver. This fact may be contained as a 1-bit indicator in scheduling allocation information for data transmission to the receiver. Alternatively, the transmitter may not use the precoding matrix indicated by a PMI fed back from the transmitter. In this case, precoding matrix information used for data transmission from the transmitter to the receiver may be explicitly contained in the scheduling allocation information. For details of PMI, the 3GPP standard document (e.g., 3GPP TS36.211) may be referred to.

CQI is information regarding channel quality. CQI may be represented by a predetermined MCS combination. CQI index may be given as shown in the following table 3.

TABLE 3

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Referring to Table 3, CQI index may be represented by 4 bits (i.e., CQI indexes of 0~15). Each CQI index may indicate a modulation scheme and a code rate.

A CQI calculation method will hereinafter be described. The following assumptions (1) to (5) for allowing a UE to calculate a CQI index are defined in the 3GPP standard document (e.g., 3GPP TS36.213).

(1) The first three OFDM symbols in one subframe are occupied by control signaling.

(2) Resource elements (REs) used by a primary synchronization signal, a secondary synchronization signal or a physical broadcast channel (PBCH) are not present.

(3) CP length of a non-MBSFN subframe is assumed.

(4) Redundancy version is set to zero (0).

(5) PDSCH transmission method may be dependent upon a current transmission mode (e.g., a default mode) configured in a UE.

(6) The ratio of PDSCH EPRE (Energy Per Resource Element) to a cell-specific reference signal EPRE may be given with the exception of $\rho_A$. (A detailed description of $\rho_A$ may follow the following assumption. Provided that a UE for an arbitrary modulation scheme may be set to a Transmission Mode 2 having four cell-specific antenna ports or may be set to a Transmission Mode 3 having an RI of 1 and four cell-specific antenna ports, $\rho_A$ may be denoted by $\rho_A = P_A + \Delta_{offset} + 10 \log_{10}(2)$ [dB]. In the remaining cases, in association with an arbitrary modulation method and the number of arbitrary layers, $\rho_A$ may be denoted by $\rho_A = P_A + \Delta_{offset}$ [dB]. $\Delta_{offset}$ is given by a nomPDSCH-RS-EPRE-Offset parameter configured by higher layer signaling.)

Definition of the above-mentioned assumptions (1) to (5) may indicate that CQI includes not only information regarding channel quality but also various information of a corresponding UE. That is, different CQI indexes may be fed back according to a throughput or performance of the corresponding UE at the same channel quality, so that it is necessary to define a predetermined reference for the above-mentioned assumption.

The UE may receive a downlink reference signal (DL RS) from an eNB, and recognize a channel state on the basis of the received DL RS. In this case, the RS may be a common reference signal (CRS) defined in the legacy 3GPP LTE system, and may be a Channel state Information Reference Signal (CSI-RS) defined in a system (e.g., 3GPP LTE-A system) having an extended antenna structure. The UE may satisfy the assumption given for CQI calculation at a channel recognized through a reference signal (RS), and at the same time calculate a CQI index in which a Block Error Rate (BLER) is not higher than 10%. The UE may transmit the calculated CQI index to the eNB. The UE may not apply a method for improving interference estimation to a CQI index calculation process.

The process for allowing the UE to recognize a channel state and determine an appropriate MCS may be defined in various ways in terms of UE implementation. For example, the UE may calculate a channel state or an effective SINR using a reference signal (RS). In addition, the channel state or the effective SINR may be measured on the entire system bandwidth (also called 'Set S') or may also be measured on some bandwidths (specific subband or specific RB). The CQI for the set S may be referred to as a Wideband (WB) CQI, and the CQI for some bandwidths may be referred to as a subband (SB) CQI. The UE may determine the best MCS on the basis of the calculated channel state or effective SINR. The best MCS may indicate an MCS that satisfies the CQI calculation assumption without exceeding a transport block error rate of 10% during the decoding. The UE may determine a CQI index related to the MCS, and may report the determined CQI index to the eNB.

Further, CQI-only transmission may be considered in which a UE transmits CQI aperiodically without having data on a PUSCH. Aperiodic CQI transmission may be event-triggered upon receiving a request from the eNB. Such request from the eNB may be a CQI request defined by one bit of DCI format 0. In addition, for CQI-only transmission, MCS index ($I_{MCS}$) of 29 may be signaled as shown in the following table 4. In this case, the CQI request bit of the DCI format 0 is set to 1, transmission of 4 RBs or less may be configured, Redundancy Version 1 (RV1) is indicated in PUSCH data retransmission, and a modulation order ($Q_m$)

may be set to 2. In other words, in the case of CQI-only transmission, only a QPSK (Quadrature Phase Shift Keying) scheme may be used as a modulation scheme.

TABLE 4

| MCS Index $I_{MCS}$ | Modulation Order $Q_m{'}$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

The CQI reporting operation will hereinafter be described in detail.

In the 3GPP LTE system, when a DL reception entity (e.g., UE) is coupled to a DL transmission entity (e.g., eNB), a Reference Signal Received Power (RSRP) and a Reference Signal Received Quality (RSRQ) that are transmitted via downlink are measured at an arbitrary time, and the measured result may be periodically or event-triggeredly reported to the eNB.

In a cellular OFDM wireless packet communication system, each UE may report DL channel information based on a DL channel condition via uplink, and the eNB may determine time/frequency resources and MCS (Modulation and Coding Scheme) so as to transmit data to each UE using DL channel information received from each UE.

In case of the legacy 3GPP LTE system (e.g., 3GPP LTE Release-8 system), such channel information may be composed of Channel Quality Indication (CQI), Precoding Matrix Indicator (PMI), and Rank Indication (RI). All or some of CQI, PMI and RI may be transmitted according to a transmission mode of each UE. CQI may be determined by the received signal quality of the UE. Generally, CQI may be determined on the basis of DL RS measurement. In this case, a CQI value actually applied to the eNB may correspond to an MCS in which the UE maintains a Block Error Rate (BLER) of 10% or less at the measured Rx signal quality and at the same time has a maximum throughput or performance.

In addition, such channel information reporting scheme may be divided into periodic reporting and aperiodic reporting upon receiving a request from the eNB.

Information regarding the aperiodic reporting may be assigned to each UE by a CQI request field of 1 bit contained in uplink scheduling information sent from the eNB to the UE. Upon receiving the aperiodic reporting information, each UE may transmit channel information considering the UE's transmission mode to the eNB over a physical uplink shared channel (PUSCH). If necessary, RI and CQI/PMI need not be transmitted over the same PUSCH.

In case of the aperiodic reporting, a cycle in which channel information is transmitted via a higher layer signal, an offset of the corresponding period, etc. may be signaled to each UE in units of a subframe, and channel information considering a transmission (Tx) mode of each UE may be transmitted to the eNB over a physical uplink control channel (PUCCH) at intervals of a predetermined time. In the case where UL transmission data is present in a subframe in which channel information is transmitted at intervals of a predetermined time, the corresponding channel information may be transmitted together with data over not a PUCCH but a PUSCH together. In case of the periodic reporting over a PUCCH, a limited number of bits may be used as compared to PUSCH. RI and CQI/PMI may be transmitted over the same PUSCH.

If the periodic reporting collides with the aperiodic reporting in the same subframe, only the aperiodic reporting may be performed.

In order to calculate a WB CQI/PMI, the latest transmission RI may be used. In a PUCCH reporting mode, RI may be independent of another RI for use in a PUSCH reporting mode. RI is valid only for CQI/PMI for use in the corresponding PUSCH reporting mode.

The CQI/PMI/RI feedback type for the PUCCH reporting mode may be classified into four feedback types (Type 1 to Type 4). Type 1 is CQI feedback for a user-selected subband. Type 2 is WB CQI feedback and WB PMI feedback. Type 3 is RI feedback. Type 4 is WB CQI feedback.

Referring to Table 5, in the case of periodic reporting of channel information, a reporting mode is classified into four reporting modes (Modes 1-0, 1-1, 2-0 and 2-1) according to CQI and PMI feedback types.

TABLE 5

| | | PMI Feedback Type | |
|---|---|---|---|
| | | No PMI (OL, TD, single-antenna) | Single PMI (CL) |
| CQI Feedback Type | Wideband | Mode 1-0<br>RI (only for Open-Loop SM)<br>One Wideband CQI (4 bit)<br>when RI > 1, CQI of first codeword | Mode 1-1<br>RI<br>Wideband CQI (4 bit)<br>Wideband spatial CQI (3 bit) for RI > 1<br>Wideband PMI (4 bit) |
| | UE Selected | Mode 2-0<br>RI (only for Open-Loop SM)<br>Wideband CQI (4 bit) | Mode 2-1<br>RI<br>Wideband CQI (4 bit) |

TABLE 5-continued

| PMI Feedback Type | |
|---|---|
| No PMI (OL, TD, single-antenna) | Single PMI (CL) |
| Best-1 CQI (4 bit) in each BP<br>Best-1 indicator(L-bit label)<br>when RI > 1, CQI of first codeword | Wideband spatial CQI (3 bit) for RI > 1<br>Wideband PMI (4 bit)<br>Best-1 CQI (4 bit) 1 in each BP<br>Best-1 spatial CQI (3 bit) for RI > 1<br>Best-1 indicator (L-bit label) |

The reporting mode is classified into a wideband (WB) CQI and a subband (SB) CQI according to a CQI feedback type. The reporting mode is classified into a No-PMI and a Single PMI according to transmission or non-transmission of PMI. As can be seen from Table 5, 'NO PMI' may correspond to an exemplary case in which an Open Loop (OL), a Transmit Diversity (TD), and a single antenna are used, and 'Single PMI" may correspond to an exemplary case in which a closed loop (CL) is used.

Mode 1-0 may indicate an exemplary case in which PMI is not transmitted but only WB CQI is transmitted. In case of Mode 1-0, RI may be transmitted only in the case of OL Spatial Multiplexing (SM), and one WB CQI denoted by 4 bits may be transmitted. If RI is higher than '1', CQI for a first codeword may be transmitted. In case of Mode 1-0, Feedback Type 3 and Feedback Type 4 may be multiplexed at different time points within the predetermined reporting period, and then transmitted. The above-mentioned Mode 1-0 transmission scheme may be referred to as Time Division Multiplexing (TDM)-based channel information transmission.

Mode 1-1 may indicate an exemplary case in which a single PMI and a WB CQI are transmitted. In this case, 4-bit WB CQI and 4-bit WB PMI may be transmitted simultaneously with RI transmission. In addition, if RI is higher than '1', 3-bit WB Spatial Differential CQI may be transmitted. In case of transmission of two codewords, the WB spatial differential CQI may indicate a differential value between a WB CQI index for Codeword 1 and a WB CQI index for Codeword 2. These differential values may be assigned to the set $\{-4, -3, -2, -1, 0, 1, 2, 3\}$, and each differential value may be assigned to any one of values contained in the set and be represented by 3 bits. In case of Mode 1-1, Feedback Type 2 and Feedback Type 3 may be multiplexed at different time points within the predetermined reporting period, and then transmitted.

Mode 2-0 may indicate that no PMI is transmitted and CQI of a UE-selected band is transmitted. In this case, RI may be transmitted only in case of open loop spatial multiplexing (OL SM), a WB CQI denoted by 4 bits may be transmitted. In each Bandwidth Part (BP), Best-1 CQI may be transmitted, and Best-1 CQI may be denoted by 4 bits. In addition, an indicator of L bits indicating Best-1 may be further transmitted. If RI is higher than '1', CQI for a first codeword may be transmitted. In case of Mode 2-0, the above-mentioned feedback type 1, feedback type 3, and feedback type 4 may be multiplexed at different time points within a predetermined reporting period, and then transmitted.

Mode 2-1 may indicate an exemplary case in which a single PMI and CQI of a UE-selected band are transmitted. In this case, WB CQI of 4 bits, WB spatial differential CQI of 3 bits, and WB PMI of 4 bits are transmitted simultaneously with RI transmission. In addition, Best-1 CQI of 4 bits and a Best-1 indicator of L bits may be simultaneously transmitted at each bandwidth part (BP). If RI is higher than '1', Best-1 spatial differential CQI of 3 bits may be transmitted. During transmission of two codewords, a differential value between a Best-1 CQI index of Codeword 1 and a Best-1 CQI index of Codeword 2 may be indicated. In Mode 2-1, the above-mentioned feedback type 1, feedback 2, and feedback type 3 may be multiplexed at different time points within a predetermined reporting period, and then transmitted.

In the UE selected SB CQI reporting mode, the size of BP (Bandwidth Part) subband may be defined by the following table 6.

TABLE 6

| System Bandwidth $N_{RB}^{DL}$ | Subband Size k (RBs) | Bandwidth Parts (J) |
|---|---|---|
| 6-7 | NA | NA |
| 8-10 | 4 | 1 |
| 11-26 | 4 | 2 |
| 27-63 | 6 | 3 |
| 64-110 | 8 | 4 |

Table 6 shows a bandwidth part (BP) configuration and the subband size of each BP according to the size of a system bandwidth. A UE may select a preferred subband within each BP, and calculate CQI for the corresponding subband. In Table 6, if the system bandwidth is set to 6 or 7, this means no application of both the subband size and the number of bandwidth parts (BPs). That is, the system bandwidth of 6 or 7 means application of only WB CQI, no subband state, and a BP of 1.

Figure 17:
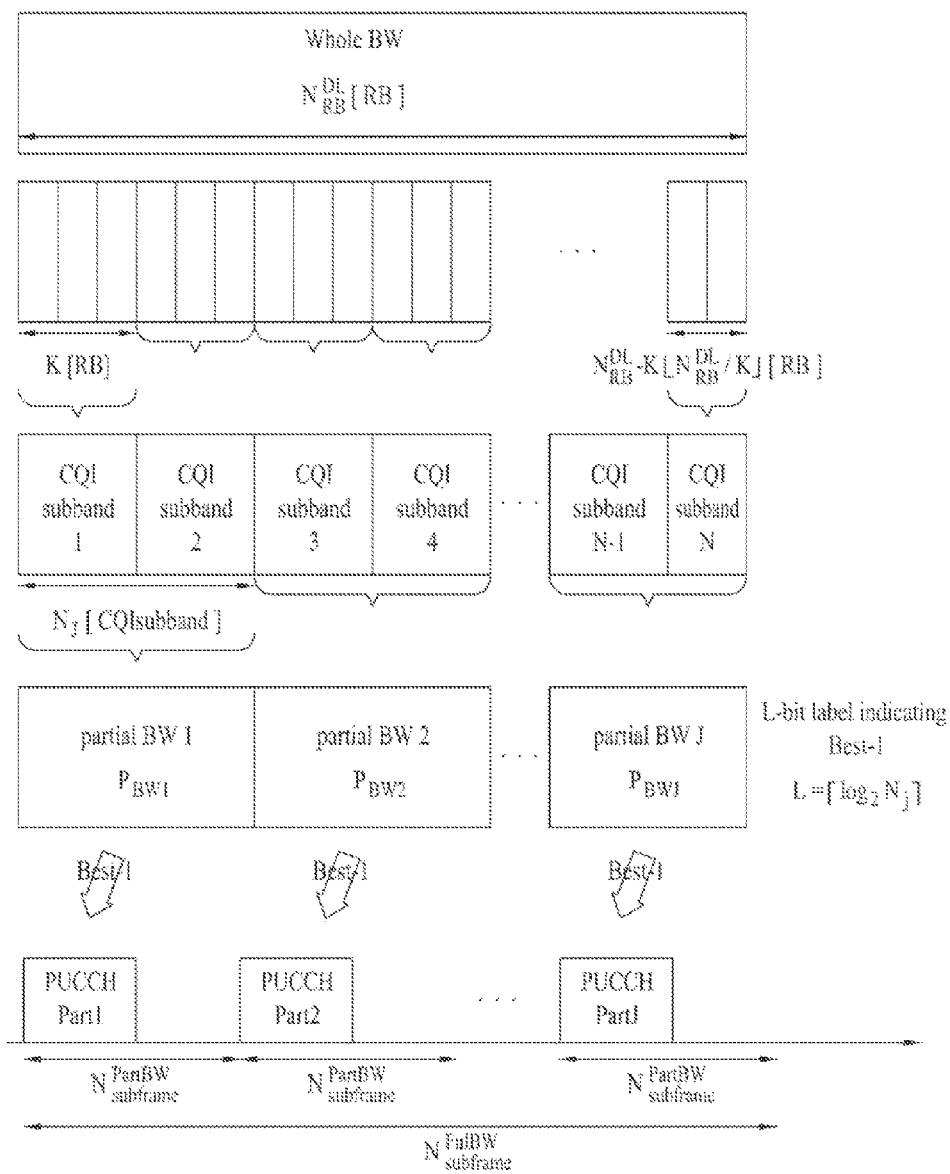
FIG. 17 is a diagram for illustrating an exemplary CQI reporting mode.

FIG. 17 shows an example of a UE selected CQI reporting mode. $N_{RB}^{DL}$ is the number of RBs of the entire bandwidth. The entire bandwidth may be divided into N CQI subbands (1, 2, 3, ..., N). One CQI subband may include k RBs defined in Table 6. If the number of RBs of the entire bandwidth is not denoted by an integer multiple of k, the number of RBs contained in the last CQI subband (i.e., the N-th CQI subband) may be determined by the following equation 14.

$$N_{RB}^{DL} - k \cdot \lfloor N_{RB}^{DL}/k \rfloor \qquad \text{[Equation 14]}$$

In Equation 14, $\lfloor \; \rfloor$ represents a floor operation, and $\lfloor x \rfloor$ or floor(x) represents a maximum integer not higher than 'x'. In addition, $N_J$ CQI subbands construct one BP, and the entire bandwidth may be divided into J BPs. UE may calculate a CQI index for one preferred Best-1 CQI subband contained in one BP, and transmit the calculated CQI index over a PUCCH. In this case, a Best-1 indicator indicating which Best-1 CQI subband is selected from one BP may also be transmitted. The Best-1 indicator may be composed of L bits, and L may be represented by the following equation 15.

$$L = \lceil \log_2 N_J \rceil \qquad \text{[Equation 15]}$$

In Equation 15, $\lceil \; \rceil$ represents a ceiling operation, and $\lceil x \rceil$ or ceiling(x) represents a minimum integer not higher than 'x'.

In the above-mentioned UE selected CQI reporting mode, a frequency band for CQI index calculation may be determined Hereinafter, a CQI transmission cycle will hereinafter be described in detail.

Each UE may receive information composed of a combination of a transmission cycle of channel information and an offset from an upper layer through RRC signaling. The UE may transmit channel information to an eNB on the basis of the received channel information transmission cycle information.

Figure 18:
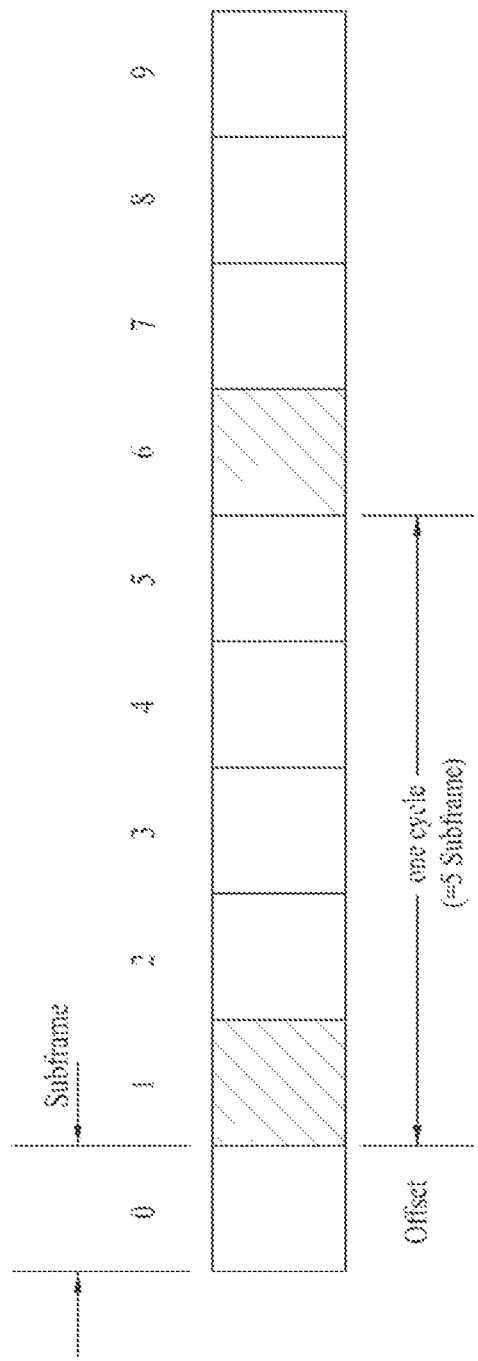
FIG. 18 illustrates an exemplary periodic channel information transmission scheme of user equipment (UE)

FIG. 18 is a conceptual diagram illustrating a method for enabling a UE to periodically transmit channel information. For example, if a UE receives combination information in which a channel information transmission cycle is set to 5 and an offset is set to 1, the UE transmits channel information in units of 5 subframes, one subframe offset is assigned in the increasing direction of a subframe index on the basis of the $0^{th}$ subframe, and channel information may be transmitted over a PUCCH. In this case, the subframe index may be comprised of a combination of a system frame number ($n_f$) and 20 slot indexes ($n_s$, 0~19) present in the system frame. One subframe may be comprised of 2 slots, such that the subframe index may be represented by $10 \times n_f + floor(n_s/2)$.

One type for transmitting only WB CQI and the other type for transmitting both WB CQI and SB CQI may be classified according to CQI feedback types. In case of the first type for transmitting only the WB CQI, WB CQI information for the entire band is transmitted at a subframe corresponding to each CQI transmission cycle. The WB periodic CQI feedback transmission cycle may be set to any of 2, 5, 10, 16, 20, 32, 40, 64, 80, or 160 ms or no transmission of the WB periodic CQI feedback transmission cycle may be established. In this case, if it is necessary to transmit PMI according to the PMI feedback type of Table 5, PMI information is transmitted together with CQI. In case of the second type for transmitting both WB CQI and SB CQI, WB CQI and SB CQI may be alternately transmitted.

Figure 19:
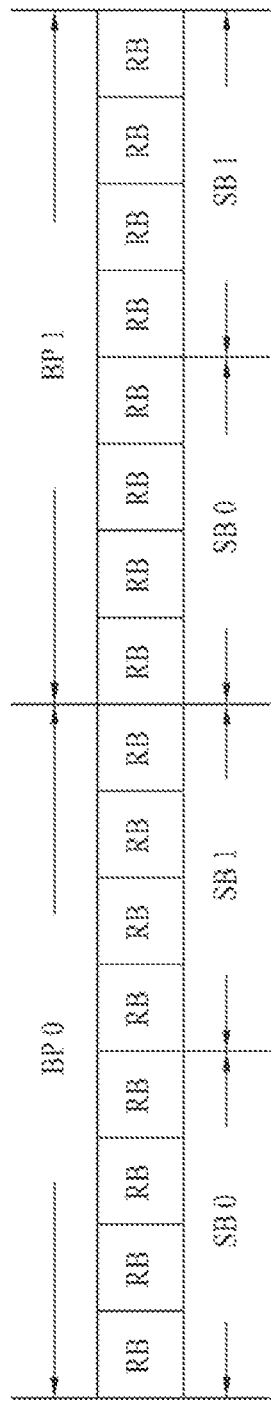
FIG. 19 is a diagram for illustrating transmission of an SB CQI.

FIG. 19 is a conceptual diagram illustrating a method for transmitting both WB CQI and SB CQI according to an embodiment of the present invention. FIG. 19 shows an exemplary system comprised of 16 RBs. If a system frequency band is comprised of 16 RBs, for example, it is assumed that two bandwidth parts (BPs) (BP0 and BP1) may be configured, each BP may be composed of 2 subbands (SBs) (SB0 and SB1), and each SB may be composed of 4 RBs. In this case, as previously stated in Table 6, the number of BPs and the size of each SB are determined according to the number of RBs contained in the entire system band, and the number of SBs contained in each BP may be determined according to the number of RBs, the number of BPs and the size of SB.

In case of the type for transmitting both WB CQI and SB CQI, the WB CQI is transmitted in the CQI transmission subframe. In the next transmission subframe, CQI of one SB (i.e., Best-1) having a good channel state from among SB0 and SB1 at BP0 and an index (i.e., Best-1 indicator) of the corresponding SB are transmitted. In the further next transmission subframe, CQI of one SB (i.e., Best-1) having a good channel state from among SB0 and SB1 at BP1 and an index (i.e., Best-1 indicator) of the corresponding SB are transmitted. After transmitting the WB CQI, CQI of individual BPs are sequentially transmitted. In this case, CQI of a BP located between a first WB CQI transmitted once and a second WB CQI to be transmitted after the first WB CQI may be sequentially transmitted one to four times. For example, if the CQI of each BP is transmitted once during a time interval between two WB CQIs, CQIs may be transmitted in the order of WB CQI→BP0 CQI→BP1 CQI→WB CQI. In another example, if the CQI of each BP is transmitted four times during a time interval between two WB CQIs, CQIs may be transmitted in the order of WB CQI→BP0 CQI→BP1 CQI→BP0 CQI→BP1 CQI→BP0 CQI→BP1 CQI→BP0 CQI→BP1 CQI→WB CQI. Information about the number of sequential transmission times of BP CQI during a time interval between two WB CQIs is signaled through a higher layer. Irrespective of WB CQI or SB CQI, the above-mentioned information about the number of sequential transmission times of BP CQI may be transmitted through a PUCCH in a subframe corresponding to information of a combination of channel information transmission cycle signaled from the higher layer and an offset of FIG. 18.

In this case, if PMI also needs to be transmitted according to the PMI feedback type, PMI information and CQI must be simultaneously transmitted. If PUSCH for UL data transmission is present in the corresponding subframe, CQI and PMI can be transmitted along with data through PUSCH instead of PUCCH.

Figure 20:
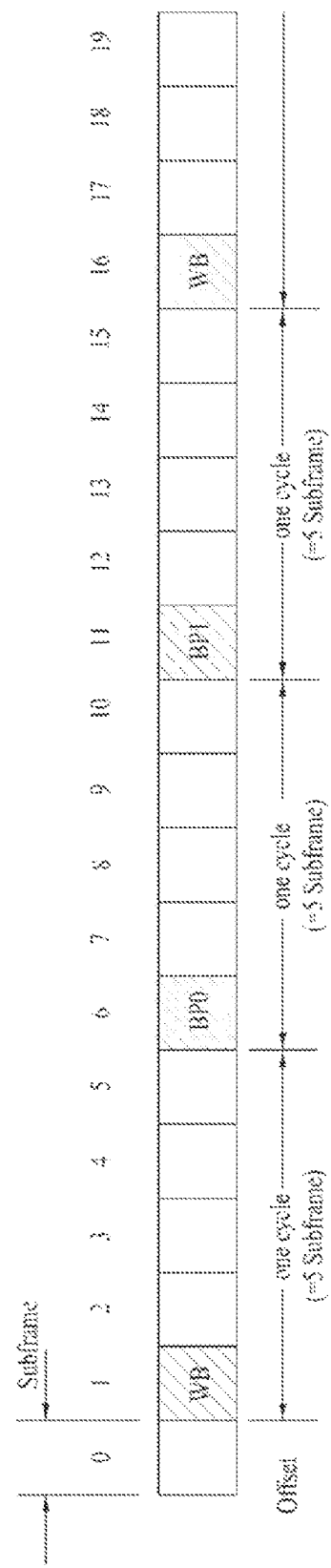
FIG. 20 is a diagram for illustrating a WB CQI and an SB CQI.

FIG. 20 is a conceptual diagram illustrating an exemplary CQI transmission scheme when both WB CQI and SB CQI are transmitted. In more detail, provided that combination information in which a channel information transmission cycle is set to 5 and an offset is set to 1 is signaled as shown in FIG. 18, and BP information between two WB CQI/PMI parts is sequentially transmitted once, FIG. 20 shows the example of channel information transmission operation of a UE.

On the other hand, in case of RI transmission, RI may be signaled by information of a combination of one signal indicating how many WB CQI/PMI transmission cycles are used for RI transmission and an offset of the corresponding transmission cycle. In this case, the offset may be defined as a relative offset for a CQI/PMI transmission offset. For example, provided that an offset of the CQI/PMI transmission cycle is set to 1 and an offset of the RI transmission cycle is set to zero, the offset of the RI transmission cycle may be identical to that of the CQI/PMI transmission cycle. The offset of the RI transmission cycle may be defined as a negative value or zero.

Figure 21:
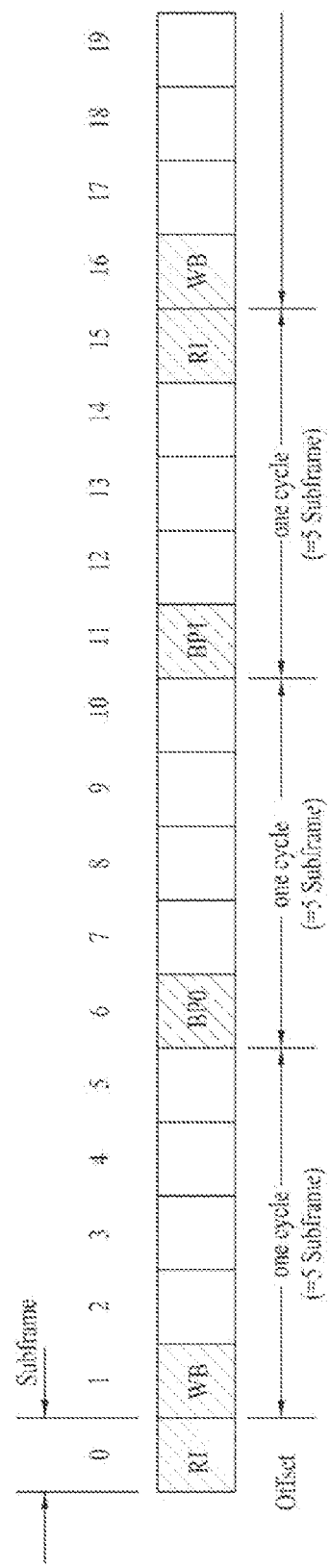
FIG. 21 is a diagram for illustrating a WB CQI, an SB CQI and an RI.

FIG. 21 is a conceptual diagram illustrating transmission of WB CQI, SB CQI and RI. In more detail, FIG. 21 shows that, under CQI/PMI transmission of FIG. 20, an RI transmission cycle is one time the WB CQI/PMI transmission cycle and the offset of RI transmission cycle is set to '−1'. Since the RI transmission cycle is one time the WB CQI/PMI transmission cycle, the RI transmission cycle has the same time cycle. A relative difference between the RI offset value '−1' and the CQI offset '1' of FIG. 20 is set to '−1', such that RI can be transmitted on the basis of the subframe index '0'.

In addition, provided that RI transmission overlaps with WB CQI/PMI transmission or SB CQI/PMI transmission, WB CQI/PMI or SB CQI/PMI may drop. For example, provided that the RI offset is set to '0' instead of '−1', the WB CQI/PMI transmission subframe overlaps with the RI transmission subframe. In this case, WB CQI/PMI may drop and RI may be transmitted.

By the above-mentioned combination, CQI, PMI, and RI may be transmitted, and such information may be transmitted from each UE by RRC signaling of a higher layer. The eNB may transmit appropriate information to each UE in consideration of a channel situation of each UE and a distribution situation of UEs included in the eNB.

Meanwhile, payload sizes of SB CQI, WB CQI/PMI, RI and WB CQI in association with the PUCCH report type may be represented by the following table 7.

TABLE 7

| PUCCH Report Type | Reported | Mode State | PUCCH Reporting Modes | | | |
|---|---|---|---|---|---|---|
| | | | Mode 1-1 (bits/BP) | Mode 2-1 (bits/BP) | Mode 1-0 (bits/BP) | Mode 2-0 (bits/BP) |
| 1 | Sub-band CQI | RI = 1 | NA | 4 + L | NA | 4 + L |
| | | RI > 1 | NA | 7 + L | NA | 4 + L |
| 2 | Wideband CQI/PMI | 2 TX Antennas RI = 1 | 6 | 6 | NA | NA |
| | | 4 TX Antennas RI = 1 | 8 | 8 | NA | NA |
| | | 2 TX Antennas RI > 1 | 8 | 8 | NA | NA |
| | | 4 TX Antennas RI > 1 | 11 | 11 | NA | NA |
| 3 | RI | 2-layer spatial multiplexing | 1 | 1 | 1 | 1 |
| | | 4-layer spatial multiplexing | 2 | 2 | 2 | 2 |
| 4 | Wideband CQI | RI = 1 or RI > 1 | NA | NA | 4 | 4 |

Aperiodic transmission of CQI, PMI and RI over a PUSCH will hereinafter be described.

In case of the aperiodic reporting, RI and CQI/PMI may be transmitted over the same PUSCH. In case of the aperiodic reporting mode, RI reporting is valid only for CQI/PMI reporting in the corresponding aperiodic reporting mode. CQI-PMI combinations capable of being supported to all the rank values are shown in the following table 8.

TABLE 8

| | | PMI Feedback Type | |
|---|---|---|---|
| | | No PMI (OL, TD, single-antenna) | with PMI (CL) |
| PUSCH CQI Feedback Type | Wideband (Wideband CQI) | | Mode 1-2: Multiple PMI<br>RI<br>$1^{st}$ Wideband CQI (4 bit)<br>$2^{nd}$ Wideband CQI (4 bit) if RI >1<br>subband PMIs on each subband |
| | UE Selected (Subband CQI) | Mode 2-0<br>RI (only for Open-Loop SM)<br>Wideband CQI (4 bit) + Best-M CQI (2 bit)<br>Best-M index<br>when RI >1, CQI of first codeword | Mode 2-2: Multiple PMI<br>RI<br>$1^{st}$ Wideband CQI (4 bit) + Best-M CQI (2 bit)<br>$2^{nd}$ Wideband CQI (4 bit) + Best-M CQI (2 bit)<br>if RI >1<br>Wideband PMI + Best-M PMI<br>Best-M index |
| | Higher layer-configured (subband CQI) | Mode 3-0<br>RI (only for Open-Loop SM)<br>Wideband CQI (4 bit) + subband CQI (2 bit)<br>when RI >1, CQI of first codeword | Mode 3-1: Single PMI<br>RI<br>$1^{st}$ Wideband CQI (4 bit) + subband CQI (2 bit)<br>$2^{nd}$ Wideband CQI (4 bit) + subband CQI (2 bit) if RI >1<br>Wideband PMI |

Mode 1-2 of Table 8 indicates a WB feedback. In Mode 1-2, a preferred precoding matrix for each subband may be selected from a codebook subset on the assumption of transmission only in the corresponding subband. The UE may report one WB CQI at every codeword, and WB CQI may be calculated on the assumption that data is transmitted on subbands of the entire system bandwidth (Set S) and the corresponding selected precoding matrix is used on each subband. The UE may report the selected PMI for each subband. In this case, the subband size may be given as shown in the following table 9. In Table 9, if the system bandwidth is set to 6 or 7, this means no application of the subband size. That is, the system bandwidth of 6 or 7 means application of only WB CQI and no subband state.

TABLE 9

| System Bandwidth $N_{RB}^{DL}$ | Subband Size (k) |
|---|---|
| 6-7 | NA |
| 8-10 | 4 |
| 11-26 | 4 |

TABLE 9-continued

| System Bandwidth $N_{RB}^{DL}$ | Subband Size (k) |
|---|---|
| 27-63 | 6 |
| 64-110 | 8 |

In Table 8, Mode 3-0 and Mode 3-1 show a subband feedback configured by a higher layer.

In Mode 3-0, the UE may report a WB CQI value calculated on the assumption of data transmission on the set-S (total system bandwidth) subbands. The UE may also report one subband CQI value for each subband. The subband CQI value may be calculated on the assumption of data transmission only at the corresponding subband. Even in the case of RI>1, WB CQI and SB CQI may indicate a channel quality for Codeword 1.

In Mode 3-1, a single precoding matrix may be selected from a codebook subset on the assumption of data transmission on the set-S subbands. The UE may report one SB CQI value for each codeword on each subband. The SB CQI value may be calculated on the assumption of a single precoding matrix used in all subbands and data transmission on the corresponding subband. The UE may report a WB CQI value for each codeword. The WB CQI value may be calculated on the assumption of a single precoding matrix used in all the subbands and data transmission on the set-S subbands. The UE may report one selected precoding matrix indicator. The SB CQI value for each codeword may be represented by a differential WB CQI value using a 2-bit subband differential CQI offset. That is, the subband differential CQI offset may be defined as a differential value between a SB CQI index and a WB CQI index. The subband differential CQI offset value may be assigned to any one of four values {−2, 0, +1, +2}. In addition, the subband size may be given as shown in the following table 9.

In Table 8, Mode 2-0 and Mode 2-2 illustrate a UE selected subband feedback. Mode 2-0 and Mode 2-2 illustrate reporting of best-M averages.

In Mode 2-0, the UE may select the set of M preferred subbands (i.e., best-M) from among the entire system bandwidth (set S). The size of one subband may be given as k, and k and M values for each set-S range may be given as shown in the following table 10. In Table 10, if the system bandwidth is set to 6 or 7, this means no application of both the subband size and the M value. That is, the system bandwidth of 6 or 7 means application of only WB CQI and no subband state.

The UE may report one CQI value reflecting data transmission only at the best-M subbands. This CQI value may indicate a channel quality for Codeword 1 even in the case of RI>1. In addition, the UE may report a WB CQI value calculated on the assumption of data transmission on the set-S subbands. The WB CQI value may indicate a channel quality for Codeword 1 even in the case of RI>1.

TABLE 10

| System Bandwidth $N_{RB}^{DL}$ | Subband Size k (RBs) | M |
|---|---|---|
| 6-7 | NA | NA |
| 8-10 | 2 | 1 |
| 11-26 | 2 | 3 |
| 27-63 | 3 | 5 |
| 64-110 | 4 | 6 |

In Mode 2-2, the UE may select the set of M preferred subbands (i.e., best-M) from among the set-S subbands (where the size of one subband is set to k). Simultaneously, one preferred precoding matrix may be selected from among a codebook subset to be used for data transmission on the M selected subbands. The UE may report one CQI value for each codeword on the assumption that data transmission is achieved on M selected subbands and selection precoding matrices are used in each of the M subbands. The UE may report an indicator of one precoding matrix selected for the M subbands. In addition, one precoding matrix (i.e., a precoding matrix different from the precoding matrix for the above-mentioned M selected subbands) may be selected from among the codebook subset on the assumption that data transmission is achieved on the set-S subbands. The UE may report WB CQI, which is calculated on the assumption that data transmission is achieved on the set-S subbands and one precoding matrix is used in all the subbands, for every codeword. The UE may report an indicator of the selected one precoding matrix in association with all subbands.

In association with entirety of UE-selected subband feedback modes (Mode 2-0 and Mode 2-2), the UE may report the positions of M selected subbands using a combination index (r), where r may be represented by the following equation 16.

$$r = \sum_{i=0}^{M-1} \binom{N - s_i}{M - i}$$ [Equation 16]

In Equation 16, the set $\{s_i\}_{i=0}^{M-1}$, $(1 \le s_i \le N, s_i < s_{i+1})$ may include M sorted subband indexes. In Equation 16, $$\binom{x}{y}$$

may indicate an extended binomial coefficient, which is set to $$\binom{x}{y}$$

in case of x≥y and is set to zero (0) in case of x<y. Therefore, r may have a unique label and may be denoted by $$r \in \left\{0, \ldots, \binom{N}{M} - 1\right\}.$$

In addition, a CQI value for M selected subbands for each codeword may be denoted by a relative differential value in association with WB CQI. The relative differential value may be denoted by a differential CQI offset level of 2 bits, and may have a value of 'CQI index—WB CQI index' of M selected subbands. An available differential CQI value may be assigned to any one of four values {+1, +2, +3, +4}.

In addition, the size (k) of supported subbands and the M value may be given as shown in Table 10. As shown in Table 10, k or M may be given as a function of a system bandwidth.

A label indicating the position of each of M selected subbands (i.e., best-M subbands) may be denoted by L bits, where L is denoted by $$L = \left\lceil \log_2 \binom{N}{M} \right\rceil.$$

Precoder for 8 Tx Antennas

A system having an extended antenna configuration (e.g. a 3GPP LTE Release-10 system) may perform MIMO transmission, for example, through 8 Tx antennas. Thus a codebook for supporting 8Tx MIMO transmission needs to be designed.

To report CSI regarding channels transmitted through 8 antenna ports, codebooks illustrated in Table 11 to Table 18 may be used. 8 CSI antenna ports may be labeled with antenna port 15 to antenna port 22. Table 11 illustrates an exemplary codebook for a 1-layer CSI report using antenna port 15 to antenna port 22. Table 12 illustrates an exemplary codebook for a 2-layer CSI report using antenna port 15 to antenna port 22. Table 13 illustrates an exemplary codebook for a 3-layer CSI report using antenna port 15 to antenna port 22. Table 14 illustrates an exemplary codebook for a 4-layer CSI report using antenna port 15 to antenna port 22. Table 15 illustrates an exemplary codebook for a 5-layer CSI report using antenna port 15 to antenna port 22. Table 16 illustrates an exemplary codebook for a 6-layer CSI report using antenna port 15 to antenna port 22. Table 17 illustrates an exemplary codebook for a 7-layer CSI report using antenna port 15 to antenna port 22. Table 18 illustrates an exemplary codebook for an 8-layer CSI report using antenna port 15 to antenna port 22.

In Table 11 to Table 18, $\phi_n$ and $v_m$ may be given as Equation 17.

$$\phi_n = e^{j\pi n/2}$$

$$v_m = [1\ e^{j2\pi m/32}\ e^{j4\pi m/32}\ e^{j6\pi m/32}]^T \quad \text{[Equation 17]}$$

TABLE 11

| $i_1$ | $i_2$ | | | |
|---|---|---|---|---|
| | 0 | 1 | 2 | 3 |
| 0-15 | $W_{2i_1,0}^{(1)}$ | $W_{2i_1,1}^{(1)}$ | $W_{2i_1,2}^{(1)}$ | $W_{2i_1,3}^{(1)}$ |
| $i_1$ | 4 | 5 | 6 | 7 |
| 0-15 | $W_{2i_1+1,0}^{(1)}$ | $W_{2i_1+1,1}^{(1)}$ | $W_{2i_1+1,2}^{(1)}$ | $W_{2i_1+1,3}^{(1)}$ |
| $i_1$ | 8 | 9 | 10 | 11 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ |
| $i_1$ | 12 | 13 | 14 | 15 |
| 0-15 | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $W_{m,n}^{(1)} = \dfrac{1}{\sqrt{8}}\begin{bmatrix} v_m \\ \varphi_n v_m \end{bmatrix}$

TABLE 12

| $i_1$ | $i_2$ | | | |
|---|---|---|---|---|
| | 0 | 1 | 2 | 3 |
| 0-15 | $W_{2i_1,2i_1,0}^{(2)}$ | $W_{2i_1,2i_1,1}^{(2)}$ | $W_{2i_1+1,2i_1+1,0}^{(2)}$ | $W_{2i_1+1,2i_1+1,1}^{(2)}$ |
| $i_1$ | 4 | 5 | 6 | 7 |
| 0-15 | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |
| $i_1$ | 8 | 9 | 10 | 11 |
| 0-15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |
| $i_1$ | 12 | 13 | 14 | 15 |
| 0-15 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ | where $W_{m,m',n}^{(2)} = \dfrac{1}{4}\begin{bmatrix} v_m & v_{m'} \\ \varphi_n v_m & -\varphi_n v_{m'} \end{bmatrix}$.

TABLE 13

| $i_1$ | $i_2$ | | |
|---|---|---|---|
| | 0 | 1 | 2 |
| 0-3 | $W_{8i_1,8i_1,8i_1+8}^{(3)}$ | $W_{8i_1+8,8i_1,8i_1+8}^{(3)}$ | $\tilde{W}_{8i_1,8i_1+8,8i_1+8}^{(3)}$ |
| $i_1$ | 3 | 4 | 5 |
| 0-3 | $\tilde{W}_{8i_1+8,8i_1,8i_1}^{(2)}$ | $W_{8i_1+2,8i_1+2,4i_1+10}^{(3)}$ | $W_{8i_1+10,8i_1+2,8i_1+10}^{(3)}$ |
| $i_1$ | 6 | 7 | 8 |
| 0-3 | $\tilde{W}_{8i_1+2,8i_1+10,8i_1+10}^{(3)}$ | $\tilde{W}_{8i_1+10,8i_1+2,8i_1+2}^{(3)}$ | $W_{8i_1+4,8i_1+4,8i_1+12}^{(3)}$ |
| $i_1$ | 9 | 10 | 11 |
| 0-3 | $W_{8i_1+12,8i_1+4,8i_1+12}^{(3)}$ | $\tilde{W}_{8i_1+4,8i_1+12,8i_1+12}^{(3)}$ | $\tilde{W}_{8i_1+12,8i_1+4,8i_1+4}^{(3)}$ |
| $i_1$ | 12 | 13 | |
| 0-3 | $W_{8i_1+6,8i_1+6,8i_1+14}^{(3)}$ | $W_{8i_1+14,8i_1+6,8i_1+14}^{(3)}$ | |
| $i_1$ | 14 | 15 | |
| 0-3 | $\tilde{W}_{8i_1+6,8i_1+14,8i_1+14}^{(3)}$ | $\tilde{W}_{8i_1+14,8i_1+6,8i_1+6}^{(3)}$ | | where $W_{m,m',m''}^{(3)} = \dfrac{1}{\sqrt{24}}\begin{bmatrix} v_m & v_{m'} & v_{m''} \\ v_m & -v_{m'} & -v_{m''} \end{bmatrix}$, $\tilde{W}_{m,m',m''}^{(3)} = \dfrac{1}{\sqrt{24}}\begin{bmatrix} v_m & v_{m'} & v_{m''} \\ v_m & v_{m'} & -v_{m''} \end{bmatrix}$

TABLE 14

| $i_1$ | $i_2$ | | | |
|---|---|---|---|---|
| | 0 | 1 | 2 | 3 |
| 0-3 | $W_{8i_1,8i_1,0}^{(4)}$ | $W_{8i_1,8i_1,1}^{(4)}$ | $W_{8i_1+2,8i_1+10,0}^{(4)}$ | $W_{8i_1+2,8i_1+10,1}^{(4)}$ |
| $i_1$ | 4 | 5 | 6 | 7 |
| 0-3 | $W_{8i_1+4,8i_1+12,0}^{(4)}$ | $W_{8i_1+4,8i_1+12,1}^{(4)}$ | $W_{8i_1+6,8i_1+14,0}^{(4)}$ | $W_{8i_1+6,8i_1+14,1}^{(4)}$ | where $W_{m,m',n}^{(4)} = \dfrac{1}{\sqrt{32}}\begin{bmatrix} v_m & v_{m'} & v_m & v_{m'} \\ \varphi_n v_m & \varphi_n v_{m'} & -\varphi_n v_m & -\varphi_n v_{m'} \end{bmatrix}$

TABLE 15

| $i_1$ | $i_2$ |
|---|---|
| | 0 |
| 0-3 | $W_{i_1}^{(5)} = \dfrac{1}{\sqrt{40}}\begin{bmatrix} v_{2i_1} & v_{2i_1} & v_{2i_1+8} & v_{2i_1+8} & v_{2i_1+16} \\ v_{2i_1} & -v_{2i_1} & v_{2i_1+8} & -v_{2i_1+8} & v_{2i_1+16} \end{bmatrix}$ |

TABLE 16

| | $i_2$ |
|---|---|
| $i_1$ | 0 |
| 0-3 | $W_{i_1}^{(6)} = \frac{1}{\sqrt{48}} \begin{bmatrix} v_{2i_1} & v_{2i_1} & v_{2i_1+8} & v_{2i_1+8} & v_{2i_1+16} & v_{2i_1+16} \\ v_{2i_1} & -v_{2i_1} & v_{2i_1+8} & -v_{2i_1+8} & v_{2i_1+16} & -v_{2i_1+16} \end{bmatrix}$ |

TABLE 17

| | $i_2$ |
|---|---|
| $i_1$ | 0 |
| 0-3 | $W_{i_1}^{(7)} = \frac{1}{\sqrt{56}} \begin{bmatrix} v_{2i_1} & v_{2i_1} & v_{2i_1+8} & v_{2i_1+8} & v_{2i_1+16} & v_{2i_1+16} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} \end{bmatrix}$ |

TABLE 18

| | $i_2$ |
|---|---|
| $i_1$ | 0 |
| 0 | $W_{i_1}^{(8)} = \frac{1}{8} \begin{bmatrix} v_{2i_1} & v_{2i_1} & v_{2i_1+8} & v_{2i_1+8} & v_{2i_1+16} & v_{2i_1+16} & v_{2i_1+24} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} & -v_{2i_1+24} \end{bmatrix}$ |

As described above, period feedback information transmission can be performed through a PUCCH and aperiodic feedback information transmission can be performed through a PUSCH. As recommended by the present invention, precoding information can be represented by a combination of PMI_1 and PMI_2. PMI_1 and PMI_2 may be respectively represented by weight matrices W1 (or i1) and W2 (or i2). When overall precoding information is composed of a combination of two different precoding information pieces, various transmission modes can be configured according to a scheme of transmitting PMI_1 and PMI_2 (frequency granularity, transmission timing, etc.) for feedback information transmission.

In aperiodic PUSCH transmission, one report can include both PMI_1 and PMI_2. If one of PMI_1 and PMI_2 is fixed (i.e., one of PMI_1 and PMI_2 has a predetermined value), one report may include only PMI_2 or PMI_1. Even in this case, the entire PMI is determined by a combination of PMI_1 and PMI_2. In addition, RI and CQI may be included with PMI_1 and PMI_2 in one report.

In periodic PUCCH transmission, a transmission scheme for signaling PMI_1 and PMI_2 at different time points (different subframes) may be considered. In this case, PMI_2 may be information regarding WB or SB. In aperiodic PUCCH transmission, a transmission scheme for determining a PMI from one report (through one subframe) may be considered. In this case, one of PMI_1 and PMI_2 is fixed (i.e., one of PMI_1 and PMI_2 has a predetermined value) and need not be signaled. When one of PMI_1 and PMI_2 is not fixed, it is not necessary to signal the non-fixed one of PMI_1 and PMI_2. Even in this case, the entire PMI is determined by a combination of PMI_1 and PMI_2. PMI_2 may be information regarding WB. In PUCCH transmission, various PUCCH feedback transmission modes can be configured according to an RI and CQI transmission scheme (frequency granularity, transmission timing, etc.).

Transmission of Feedback Information on PUCCH

Feedback information that a receiver transmits to a transmitter for reliable MIMO transmission may include an RI, a PMI, CQI, an ACK/NACK, an SR, etc. An RI, a PMI, CQI, etc. may be used as channel information for data transmission. To feedback channel information in a system supporting extended multi-antenna transmission, a feedback information reporting scheme may be configured based on feedback modes defined in the legacy 3GPP LTE Release-8 system (e.g. the feedback modes described before in relation to Table 5). First of all, conventional feedback modes will be described in brief.

The properties of reported feedback information may be classified into short term and long term in terms of time and SB and WB in terms of frequency. Specifically, an RI is long-term WB information. A PMI indicating a precoding matrix that represents the long-term covariance of a channel is long-term WB information and a PMI reported in a short term is short-term WB or short-term SB information. CQI may be reported more often than an RI and may be classified as SB CQI or WB CQI according to a reported frequency granularity.

In the 3GPP LTE Release-8 system, channel information may be transmitted according to transmission time points as illustrated in Table 19.

TABLE 19

| | T_1 | T_2 | T_3~T_N |
|---|---|---|---|
| Mode 1-0 | RI | Wideband CQI | |
| Mode 2-0 | RI | Wideband CQI | Best-1 CQI in each BP |
| Mode 1-1 | RI | Wideband CQI Wideband PMI | |
| Mode 2-1 | RI | Wideband CQI Wideband PMI | Best-1 CQI in each BP |

In Mode 1-0, an RI is reported in an uplink transmission subframe T_1 and then WB CQI is reported in another uplink transmission subframe T_2. The RI and the WB CQI are reported periodically and the reporting period of the RI is a multiple of that of the WB CQI. A specific offset may be set between the subframe T_1 carrying the RI and the subframe T_2 carrying the WB CQI and the offset may be 0 at minimum. In Mode 2-0, SB CQI transmission is added to Mode 1-0. An SB is selected from a specific BP and CQI for the selected SB is reported as SB CQI. Mode 1-1 and Mode 2-1 are cases where PMI transmission is added to Mode 1-0 and Mode 2-0, respectively. The PMI is a WB PMI which is transmitted along with WB CQI.

The system supporting an extended antenna configuration (e.g. the 3GPP LTE-A system) may use different precoding matrices in configuring precoding weights. As the receiver reports an index indicating each precoding matrix, the transmitter may configure a precoding weight for a channel. For example, to configure a feedback codebook including two different precoding matrices, indexes included in the respective precoding matrices may be reported. The indexes may be referred to as PMI_1 and PMI_2, respectively. PMI_1 may be a precoding weight reflecting long-term fading and PMI_2 may be a precoding weight reflecting short-term fading. For example, PMI_1 indicating a long-term covariance matrix like a channel covariance matrix may be reported less frequently and may be expressed as a value that does not substantially change (an almost same value) in a WB. Accordingly, PMI_1 may be reported in the same period as that of an RI. On the other hand, PMI_2 reflecting short-term fading is reported more frequently. If PMI_2 applies to a WB, it may be reported in a similar period to that of WB CQI. If PMI_2 applies to an SB, it may be reported at a reporting position of each SB CQI.

Reported PMI and CQI may have different values according to a rank. If the size of each piece of the PMI and CQI is known, the number of decodings may be reduced, thereby increasing system performance. Therefore, if a time or frequency is allocated for transmitting an RI on an uplink transmission channel, information for decoding PMI and CQI may be acquired after RI information is first interpreted. Therefore, PMI_1 reported in a long term is preferably transmitted at a different time point or in a different frequency from an RI.

Now, specific examples of feedback information transmission timing according to the present invention will be described.

In an example, PMI_1 may be a WB PMI and transmitted in the same period as an RI. The reporting timing of PMI_1 may have a specific offset with respect to that of an RI. The offset may be 1 at minimum. That is, PMI_1 may be reported after the RI, rather than PMI_1 and the RI are transmitted simultaneously.

In another example, the transmission period of PMI_1 may be set to be shorter than that of the RI and longer than PMI_2. That is, PMI_1 is transmitted more frequently than the RI and less frequently than PMI_2.

In a third example, PMI_1 and the RI may be transmitted together. In this case, the RI and PMI_1 are separately encoded.

In a fourth example, when PMI_1 and the RI are separately encoded, different coding schemes may be used according to the amount of information. For example, if 1 or 2 bits are required to carry information included in PMI_1 or the RI, a conventional coding scheme used for ACK/NACK transmission may be adopted. If 3 to 13 bits are required, a conventional coding scheme used for CQI transmission may be used.

In a fifth example, PMI_2 and the WB CQI may be transmitted together. In this case, PMI_2 may be a value reflecting a WB. Then feedback information may be transmitted at transmission timings illustrated in Table 20. In Table 20, an RI is transmitted at time T_1, followed by WB PMI_1 at time T_2 and then both WB CQI and WB PMI_2 at time T_3 in Mode 1-2. In Table 20, Mode 2-2 is defined by adding SB CQI transmission to Mode 2-1.

TABLE 20

| | T_1 | T_2 | T_3 | T_4~T_N |
|---|---|---|---|---|
| Mode 1-2 | RI | Wideband PMI_1 | Wideband CQI Wideband PMI_2 | |
| Mode 2-2 | RI | Wideband PMI_1 | Wideband CQI Wideband PMI_2 | Best-1 CQI in each BP |

In a sixth example, CQI may be reported by applying a predetermined PMI (i.e. a PMI preset between a transmitter and a receiver). As a consequence, the amount of feedback information may be decreased. For example, a preset PMI may be used as PMI_2 and the receiver may not feedback PMI_2 separately. Herein, different PMI_2 values may be used on an arbitrary SB basis.

In a seventh example, PMI_1 may be represented in N bits and PMI_2 may be represented in M bits (M<N), when feedback information is configured. The amount of the feedback information may vary with a rank. For example, PMI_1 and PMI_2 may be 4 bits and 3 bits respectively, for rank-1 transmission. For transmission with a rank higher than 1, PMI_1 may be represented in fewer than 4 bits and PMI_2 may be represented in fewer than 3 bits.

In an eighth example, when PMI_1 is expressed in fewer than 4 bits, a channel coding scheme used for CQI coding may be applied to PMI_1.

Meanwhile, specific examples of transmitting PMI_1 and WB CQI together according to the present invention will be described.

In an example, it is assumed that PMI_1 is WB information and PMI_1 and WB CQI are transmitted simultaneously at a transmitting timing of PMI_1. A PMI should be determined to calculate CQI and the PMI is determined by PMI_1 and PMI_2. Here, PMI_1 may be set to a value transmitted along with the WB CQI and PMI_2 may be a preset value. PMI_2 may be information preset on an arbitrary SB basis or on a WB basis. A new PMI may be set using the preset PMI_2 and the selected PMI_1 and the WB CQI may be calculated based on channel information changed by applying the new PMI.

In another example, after PMI_1 and the WB CQI are reported, SB CQI may be reported. The SB CQI may be calculated based on the preset PMI_2. In addition, one CQI may be reported for each BP.

In a third example, after PMI_1 and the WB CQI are reported, the SB CQI and PMI_2 may be reported.

Referring to Table 21, a case where WB PMI_1 and SB PMI_2 are transmitted will be described as a more specific example. In Table 21, Mode 2-2 is a modification example of Mode 2-2 described in Table 12.

TABLE 21

| | T_1 | T_2 | T_3 |
|---|---|---|---|
| Mode 2-2 | RI | Wideband PMI_1 Wideband CQI | Best-1 CQI in each BP Subband PMI_2 |

As described before, a precoding weight may be a combination of PMI_1 and PMI_2. Herein, PMI_1 and PMI_2 are applied to a WB and an SB, respectively. Especially, PMI_2 may be defined as a precoding weight suitable for a BP. A WB may include one or more BPs and a BP may include one or more SBs.

In accordance with an embodiment of the present invention, an RI, WB PMI_1/WB CQI, and SB CQI/SB PMI_2 may be transmitted at different time points. As illustrated in Table 21, the RI may be transmitted at time T_1, WB PMI_1 and/or the WB CQI at time T_2, and the SB CQI and/or SB PMI_2 at time T_3. The SB CQI is CQI for an optimum SB (Best-1) selected from a BP. SM PMI_2 is a PMI applied to a BP. The WB CQI may be defined as a value calculated based on a PMI composed of WB PMI_1 and a plurality of BP PMI_2s. The SB CQI is calculated for an SB selected from a specific BP. The SB CQI may be calculated based on a PMI composed of PMI_1 applied to the WB and PMI_2 applied to the BP.

A feedback report on a PUCCH delivers limited information because the PUCCH has a narrow channel space for feedback information, compared to a PUSCH. Accordingly, W1 and W2 may not be fed back simultaneously on the PUCCH. In this case, a WB value may be reported as W2, or a fixed index (i.e. a preset value) may be used as W2.

For example, enhanced PUCCH feedback mode 1-1 may be defined by extending the conventional PUCCH feedback mode 1-1 (a mode of reporting WB CQI and a WB PMI) in order to report WB CQI, WB W1, and fixed W2.

In addition, enhanced PUCCH feedback mode 2-1 may be defined by extending the conventional PUCCH feedback mode 2-1 (a mode of reporting SB CQI and band indication for an SB selected from a BP along with band cycling, while reporting WB CQI and a WB PMI) in order to report WB CQI, WB W1, fixed W2, SB CQI and band indication for an SB selected from a BP with band cycling, and SB W2 for the selected band.

To obtain WB CQI in a PUCCH feedback mode, a precoder W should be determined. When the precoder W is determined, a precoding matrix index may be selected as W1 from a codebook set and W2 may be a fixed index.

PUCCH feedback mode 2-1 may be configured by combining information reported in PUCCH feedback mode 1-1 with additional CQI/PMI information. The information reported in PUCCH feedback mode 1-1 and the additional CQI/PMI information may be transmitted at different time points (timings). The additional CQI/PMI information may be dependent on PUCCH feedback mode 1-1. That is, W1 at the timing of reporting in PUCCH feedback mode 1-1 is used as precoder information necessary to calculate the additional CQI information. If WB CQI and WB W1 are missed, next additional CQI/PMI information may not be used. W2 that forms the additional CQI/PMI information may be determined to be a precoder for an SB selected from a BP.

Accordingly, information may be transmitted at transmission timings illustrated in Table 22 in PUCCH feedback mode 2-1.

TABLE 22

| T1 | T2 | T3 | T4 |
|---|---|---|---|
| Rank | WB CQI<br>WB W1 | SB CQI<br>SB W2<br>Band Indication<br>in bandwidth part N | SB CQI<br>SB W2<br>Band Indication<br>in bandwidth part N + 1 |

As noted from Table 22, rank information may be transmitted in a duration being integer multiples of reporting durations of WB CQI and SB CQIs, with specific time offsets from the reporting durations of the WB CQI and SB CQIs. If the rank information and CQI/PMI information are transmitted at the same time, the CQI/PMI information may be dropped. The WB CQI may be calculated based on WB W1 and fixed W2 (preset W2).

A feedback scheme when a multi-granular precoder is defined according to an embodiment of the present invention will now be described.

The multi-granular precoder may be configured of a combination of two different codebooks (W1 and W2). W1 and W2 can be composed of codebooks in various forms. Accordingly, when different types of feedback indicators (W1 and W2) with respect to precoders are reported to an eNB, the eNB can select the entire precoder. Different pieces of information (W1 and W2) about the precoder may be reported at different timings. For example, W1 may be reported in a long term and W2 may be reported in a short term. When W1 is reported in a long term, RI can be reported with W1. Alternatively, W1 and W2 may be reported simultaneously. That is, when the multi-granular precoder is employed, feedback information transmission timings may be set as shown in Table 23.

TABLE 23

| | T1 | T2 |
|---|---|---|
| Mode (1) | Rank + W1(wideband) | W2(wideband) + CQI(wideband) |
| Mode (2) | Rank | W1(wideband) + W2(wideband) + CQI(wideband) |

In mode (1) of Table 23, RI and WB W1 may be transmitted at the same time T1, followed by WB W2 and WB CQI at time T2. In mode (2) of Table 23, RI may be transmitted at time T1, followed by WB W1, WB W2 and WB CQI at time T2.

When the indicators W1 and W2 for the precoder are reported at different timings or at the same timing, a case in which a PMI/CQI of a limited rank is fed back may be considered. In this case, W1 and W2 suitable for the limited rank may be selected and fed back. In addition, CQI calculated according to the selected W1 and W2 may be fed back. Here, W1, W2 and CQI can be reported at the same time (one subframe).

A scheme of feeding back information including a PMI/CQI of a limited rank when the multi-granular precoder is applied will now be described with reference to FIGS. 22 and 23.

Figure 22:
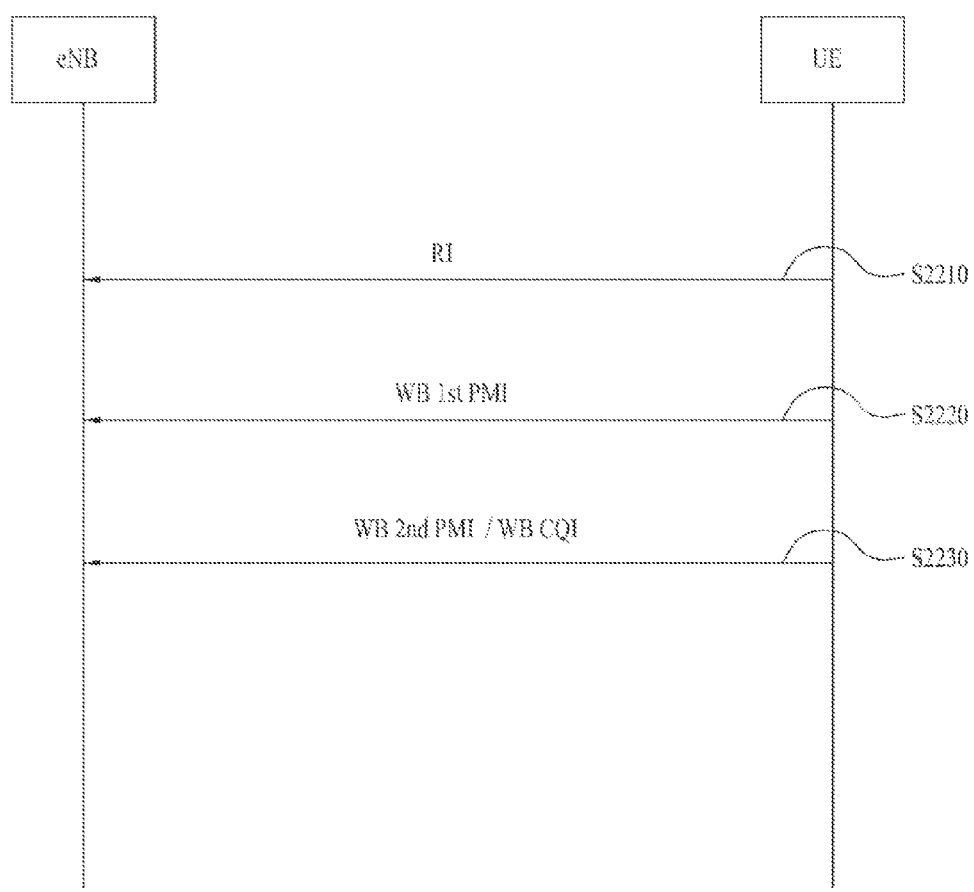
FIGS. 22 and 23 is a diagram for illustrating channel state information reporting periods.

FIG. 22 shows simultaneous transmission of RI and PMI1 (i.e., WB W1) followed by transmission of WB PMI_2 (i.e., WB W2) and WB CQI. The transmitted PMI1, PMI2 and CQI are feedback information selected and calculated according to a rank recommended by a UE. The PMI/CQI of the limited rank may be transmitted at a timing with a predetermined offset ($N_{offset,CQI}$) from a CQI/PMI transmission timing according to the rank recommended by the UE. FIG. 22 shows transmission of PMI1, PMI_2 and CQI according to the limited rank at a timing having a value $\lfloor Ns/2 \rfloor$ of 2.

Figure 23:
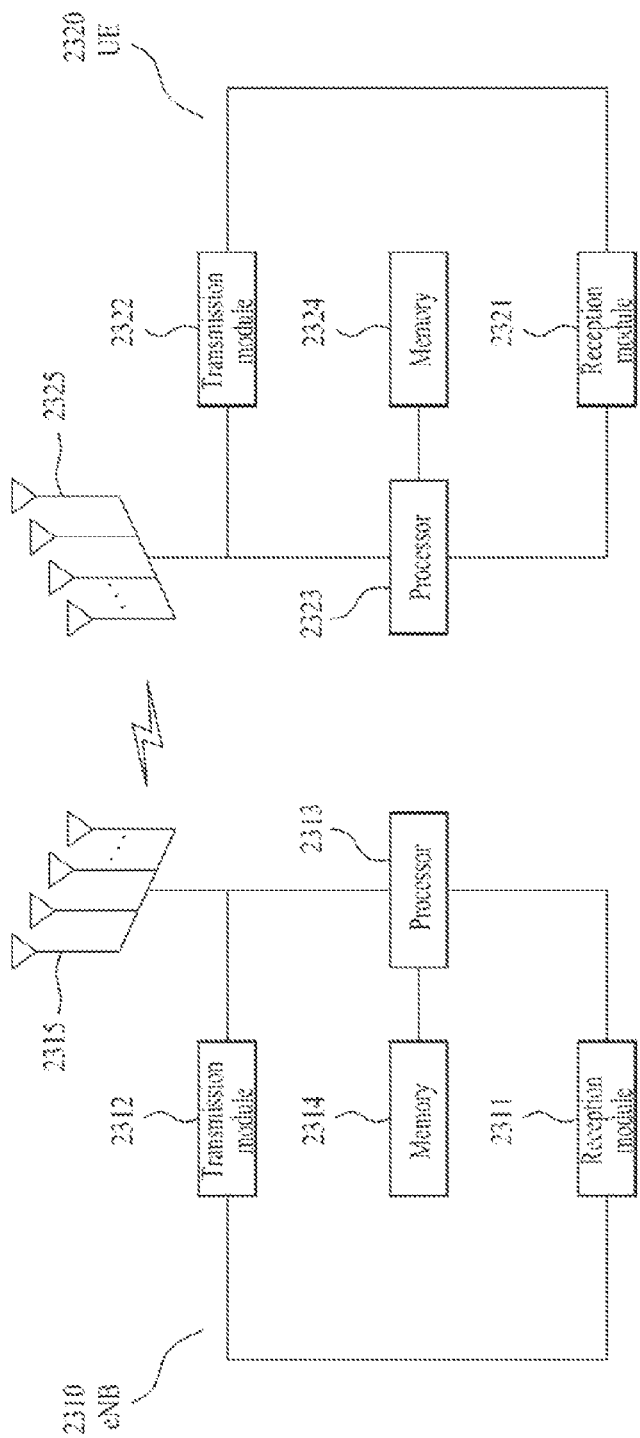

FIG. 23 shows transmission of RI followed by simultaneous transmission of WB PMI1 (i.e., WB W1), WB PMI_2 (i.e., WB W2) and WB CQI. The transmitted PMI1, PMI_2 and CQI are feedback information selected and calculated according to a rank recommended by a UE. The PMI/CQI of the limited rank may be transmitted at a timing with a predetermined offset ($N_{offset,CQI}$) from a CQI/PMI transmission timing according to the rank recommended by the UE. FIG. 23 shows transmission of PMI1, PMI2 and CQI according to the limited rank at a timing having value $\lfloor Ns/2 \rfloor$ of 2.

A feedback scheme when the multi-granular precoder is applied according to another embodiment of the present invention will now be described.

When an eNB is reported about multi-granular precoder indicators (i.e., W1 and W2), different feedback modes can be indicated using a precoder type indication (PTI) bit.

In one feedback mode, RI, W1 and W2/CQI are transmitted in different subframes and W1, W2 and CQI are set to WB information. In the other feedback mode, W2 and CQI are reported in the same subframe, a frequency granularity of W2/CQI corresponds to a WB or an SB according to the reported subframe. That is, feedback modes as shown in Table 23 can be defined.

TABLE 23

|  | T1 | T2 | T3 |
|---|---|---|---|
| Mode (1) | PTI(0) + Rank | W1(wideband) | W2(wideband) + CQI(wideband) |
| Mode (2) | PTI(1) + Rank | W2(wideband) + CQI(wideband) | W2(subband) + CQI(subband) |

Referring to Table 23, when the PTI bit is 0, feedback may be performed according to a mode in which RI is transmitted at time T1, followed by WB W1 at time T2 and then WB W2 and WB CQI at time T3. When the PTI bit is 1, feedback may be performed according to a mode in which RI is transmitted at time T1, followed by WB W1 and WB CQI at time T2 and then SB W2 and SB CQI at time T3.

Mode (1) or mode (2) of Table 23 can be determined according to the RI feedback period. After determining mode (1) or mode (2) by the PTI bit, WB W1 and WB W2/WB CQI may be reported (mode (1)) or WB W2/WB CQI and SB W2/SB CQI may be reported (mode (2)). A reference of the reported period may be set to transmission timing. Transmission timing of feedback information other than WB W1/WB CQI can be determined by an offset for the transmission timing of WB W2/WB CQI.

In the feedback scheme according to the present embodiment, schemes of setting a WB W1 feedback period and an offset will now be described.

In accordance with a first scheme, the WB W1 feedback period may be set to be longer than a PTI/RI transmission period (i.e., less frequently). In addition, the WB W1 feedback period may be set to an integer multiple of a WB W2/WB CQI transmission period. In addition, the WB W1 transmission timing may be set to an offset value for reference timing (i.e., WB W2/WB CQI transmission subframe).

According to a second scheme, the WB W1 transmission timing may be set to an offset value for the reference timing (i.e., WB W2/WB CQI transmission subframe). When PTI is set to a predetermined value (0 or 1) in PTI/RI feedback information, WB W1 can be transmitted one time right after PTI/RI transmission timing.

In the feedback scheme according to the present embodiment, a scheme of feeding back a PMI/CQI of a limited rank will now be described. WB W1, WB W2, WB CQI, SB W2 and SB CQI are feedback information selected and calculated according to a rank recommended by a UE, and the PMI/CQI of the limited rank may be additionally transmitted.

Provided that PTI reported with RI is set to 0, a WB PMI/WB CQI may be reported as the PMI/CQI of the limited rank. WB W1, WB W2 and WB CQI of the limited rank are reported at the same timing. WB W1, WB W2 and WB CQI of the limited rank can be simultaneously reported in some subframes from among subframes in which WB W2+WB CQI according to the rank recommended by the UE are reported.

When PTI reported with RI is set to 1, the PMI/CQI of the limited rank may be reported. In this case, two schemes may be considered to report the PMI/CQI of the limited rank.

One scheme reports only WB W1, WB W2 and WB CQI of the limited rank as the PMI/CQI of the limited rank.

The other scheme reports WB W1, WB W2 and WB CQI of the limited rank in one subframe and reports SB W2 and SB CQI of the limited rank in a different subframe. Transmission timings of WB W1, WB W2 and WB CQI of the limited rank and SB W2 and SB CQI of the limited rank may be set according to band cyclic reporting period.

Hereinafter, exemplary PUCCH reporting modes are described.

In periodic CQI/PMI/RI transmission, CQI, CQI/PMI, preferred subband selection and CQI information may be calculated on the basis of the last reported periodic RI, and subband selection and CQI value may be calculated on the basis of the last reported periodic WB PMI and RI. Two precoder indexes (I1 and I2) may be reported at different timings or at the same timing. Based on this, reporting modes as shown in Table 25 can be considered in feedback information transmission.

TABLE 25

|  |  | T1 | T2 | T3 |
|---|---|---|---|---|
|  | Mode 1-1-1 | (RI + I1)_WB | (I2 + CQI)_WB |  |
|  | Mode 1-1-2 | (RI)_WB | (I1 + I2 + CQI)_WB |  |
| Mode 2-1 | Mode 2-1(1) | (RI + PTI(0)) | (I1)_WB | (I2 + CQI)_WB |
|  | Mode 2-1(2) | (RI + PTI(1)) | (I2 + CQI)_WB | (I2 + CQI)_SB |

In Table 25, I1 and I2 denote indexes of codebooks composed of precoder elements and PTI denotes a precoder type indication bit.

In mode 1-1-1 of Table 23, precoder index I1 indicates the index of a precoder calculated and selected on the basis of RI transmitted in a current subframe, and precoder index I2 indicates the index of a precoder calculated and selected on the basis of the last reported RI and the last reported I1. CQI represents a value calculated on the basis of the last reported RI, the last reported I1 and currently reported I2.

In mode 1-1-2 of Table 25, precoder indexes I1 and I2 indicate indexes of precoders calculated and selected on the basis of the last reported RI. CQI represents a value calculated on the basis of the last reported RI and currently reported I1 and I2.

In mode 2-1(1) of Table 25, precoder index I1 indicates a precoder index calculated and selected on the basis of the last reported RI. Precoder index I2 indicates a precoder index calculated and selected on the basis of the last reported RI and the last reported IL CQI represents a value calculated on the basis of the last reported RI, the last reported RI and currently reported I2. When I1 and I2+CQI are reported in an (RI+PTI) transmission period, I1 may be reported one time and I2+CQI may be reported multiple times. Alternatively, when I1 and I2+CQI are reported in the RI+PTI transmission period, I1 may be reported twice and I2+CQI may be reported multiple times. In addition, I1 may be continuously reported, or I1 and I2+CQI may be alternately reported. Alternatively, I1 may be reported right after or before RI+PTI reporting.

In mode 2-1(2) of Table 25, precoder index I1 indicates a precoder index calculated and selected on the basis of the last reported RI and precoder index I2 indicates a precoder index calculated and selected on the basis of the last reported RI and the last reported IL CQI represents a value calculated on the basis of the last reported RI, the last reported I1 and currently reported I2. SB CQI and SB I2 denote a value and an index calculated and selected on the basis of the last reported RI and the last reported I1, respectively.

Mode 2-1 of Table 25 will now be described in more detail.

Mode 2-1 (mode 2-1(1) and mode 2-1(2)) of Table 25 may correspond to an extension form of PUCCH reporting mode 2-1 of the above table 5. PUCCH reporting mode of Table 5 is defined in 3GPP LTE release-8/9 system and reports a WB PMI/CQI and SB CQI. Here, SB CQI means CQI of an SB selected in a BP. A BP is a subset of system bandwidths, and a plurality of SB CQIs may be reported since BPs that can be defined in system bandwidths are selected cyclically according to time and CQIs of the BPs are reported. That is, RI/PMI/CQI can be reported in the time order of (RI)-(WB PMI/CQI)-(SB CQI in a first BP)-(SB CQI in a second BP)-....-(SB CQI in an n-th BP). In this case, upon determination of a PMI/CQI reporting period and an offset through RRC signaling, WB PMI/CQI and SB CQI may be reported according to the determined reporting period. RI is set such that it has a period of an integer multiple of the WB PMI/CQI reporting period. The RI may be set such that it is reported before subframes corresponding to an offset set using an offset indicator from WB PMI/CQI transmission timing.

A reporting mode corresponding to an extension form of PUCCH reporting mode 2-1 of Table 5 may be defined as a PUCCH reporting mode in a system (e.g., 3GPP LTE release-10 system) supporting an extended antenna configuration.

Similarly to definition of four feedback types (i.e., type 1 corresponds to CQI feedback for a subband selected by a UE, type 2 corresponds to WB CQI feedback and WB PMI feedback, type 3 corresponds to RI feedback, type 4 corresponds to WB CQI feedback) as CQI/PMI/RI feedback types for the PUCCH reporting mode in 3GPP LTE release-8/9, four CQI/PMI/RI feedback types can be defined for the PUCCH reporting mode in 3GPP LTE release-10. For example, reporting type 1 can be defined as RI/PTI feedback, reporting type 2 can be defined as WB I1 feedback, reporting type 3 can be defined as WB I2/CQI feedback, and reporting type 4 can be defined as SB I2/CQI feedback. When PTI of type 1 is set, a reporting type can be determined. For instance, if PTI of type 1 is 0, type 1-type 2-type 3 are used for reporting. When PTI of type 1 is 1, type 1-type 3-type 4 are used for reporting. Accordingly, mode 2-1(1) and mode 2-1(2) of Table 25 can be defined.

When a precoder element is indicated using one precoder index, PTI is always set to 1 such that type 1-type 3-type 4 are used for reporting as in the case of transmission using two Tx antennas or transmission using four Tx antennas. This scheme is distinguished from the reporting scheme of 3GPP LTE release-8/9 in that SB PMI/CQI is transmitted in type 4. To allow type-4 transmission in 3GPP LTE release-10 system to be performed as in 3GPP LTE release-8/9 system, one or more BPs in a system bandwidth may be cyclically reported and a PMI/CQI with respect to a preferred SB in a BP may be reported. In this case, a type 3 or type 4 reporting period can be determined through the same method of setting the PMI/CQI reporting period in 3GPP LTE release-8/9 system. For example, type 3 and type 4 can be reported according to a period set for PMI/CQI. A type 1 reporting period can be determined through the same method of setting an RI reporting period in 3GPP LTE release-8/9. For example, the type 1 reporting period can be set to an integer multiple of the type 3 reporting period. An offset value can be set such that type 1 is transmitted in a subframe a predetermined number of subframes ahead of a subframe in which type 3 is reported.

When precoder elements are indicated using two different precoder indexes as in transmission using eight Tx antennas, (type 1-type 2-type 3) or (type 1-type 3-type 4) may be reported according to a PTI value. When two different feedback type sets are selected according to PTI, it is necessary to determine a reporting period for each feedback type. Schemes for signaling the reporting period to be applied to each feedback type will now be described.

According to a first scheme, when the type 1 (RI+PTI) reporting period is set irrespective of a PTI value, the type 1 (RI+PTI) reporting period can be set on the basis of type 3 when PTI is 1 (i.e., type 3 in a reporting mode corresponding to the order of type 1-type 3-type 4).

According to a second scheme, when the type 1 (RI+PTI) reporting period is set irrespective of the PTI value, the type 1 (RI+PTI) reporting period can be set on the basis of type 3 when PTI is 0 (i.e., type 3 in a reporting mode corresponding to the order of type 1-type 2-type 3).

According to a third scheme, when the type 1 (RI+PTI) reporting period is set irrespective of a PTI value, the type 1 (RI+PTI) reporting period can be set on the basis of type 2 when PTI is 0 (i.e., type 2 in a reporting mode corresponding to the order of type 1-type 2-type 3).

According to a fourth scheme, the type 1 (RI+PTI) reporting period can be set depending on the PTI value. For example, when PTI=1 and one cycle for transmission of one type 3 (WB I2/CQI) and one or more type 4s (SB I2/CQI) is set, the type 1 (RI+PTI) reporting period can be set to an integer multiple of the one cycle. When PTI=0 and one cycle for transmission of one type 2 (WB I1) and one type 3 (WB I2/CQI) is set, the type 1 (RI+PTI(=0)) reporting period can be set to an integer multiple of the one cycle. In this manner, a required minimum cycle can be set differently when PTI=0 and PTI=1.

According to a fifth scheme, provided that a duration necessary for CQI/PMI transmission when PTI=1 and a duration necessary for CQI/PMI transmission when PTI=0 are different from each other, repeated transmission of feedback information can be performed in a shorter duration on the basis of a longer duration. For example, provided that transmission of one type 2 (WB I1) and one type 3 (WB I2/CQI) is required when PTI=0 and transmission of one type 3 (WB I2/CQI) and a plurality of type 4s (SB I2/CQI) is required when PTI=1, the case of PTI=0 corresponds to a shorter duration and the case of PTI=1 corresponds to a longer duration. In this case, the shorter duration can be repeated to correspond to the longer duration. That is, type 2 and/or type 3 can be repeatedly transmitted in case of PTI=0. Here, type 3 may be repeatedly reported after type 2 is reported, or both type 2 and type 3 may be repeatedly reported.

According to a sixth scheme, provided that a duration necessary for CQI/PMI transmission when PTI=1 and a duration necessary for CQI/PMI transmission when PTI=0 are different from each other, some of reported information corresponding to a longer duration may be missed and transmitted in the next type 1 transmission duration on the basis of a shorter duration. For example, provided that transmission of one type 2 (WB I1) and one type 3 (WB I2/CQI) is required when PTI=0 and transmission of one type 3 (WB I2/CQI) and a plurality of type 4s (SB I2/CQI) is required when PTI=1, the case of PTI=0 corresponds to a shorter duration and the case of PTI=1 corresponds to a longer duration. In this case, some information (e.g., type 4) corresponding to the longer duration can be missed and one type 2 and one type 4 can be reported. If type 4 reports CQI/PMI according to band cycle scheme, CQI/PMI of a different BP may be transmitted according to type 1 transmission intervals.

Transmission of Feedback Information on PUSCH

An RI and WB CQI/WB PMI CQI/SB PMI_2 may be fed back on a PUSCH. Various transmission modes may be defined for feedback information transmitted on a PUSCH according to the frequency granularity and combination scheme of transmitted CQI/PMI. Hereinbelow, various transmission modes proposed by the present invention, Mode 1-1, Mode 1-2, Mode 1-3, Mode 2-2-1, Mode 2-2-2, Mode 2-3, Mode 3-1, and Mode 3-2 will be described.

In Mode 1-1, WB CQI for a first CW, WB CQI for a second CW, WB PMI_1, and WB PMI_2 are transmitted. The WB CQI for the first CW may be expressed as a specific value quantized to N bits. The WB CQI for the second CW may also be expressed as a specific value quantized to N bits. For example, N may be 4.

In Mode 1-2, an RI, WB CQI and SB CQIs for a first CW, WB CQI and SB CQIs for a second CW, WB PMI_1, and WM PMI_2 are transmitted. The WB CQI for the first CW may be expressed as a specific value quantized to N bits. An SB CQI for the first CW may be expressed in M (M<N) bits, relative to N. The WB CQI for the second CW may also be expressed as a specific value quantized to N bits. SB CQI for the second CW may be expressed in M (M<N) bits, relative to N. For example, N may be 4 and M may be 2. The SB CQIs are for all SBs included in a total band. For example, enhanced PUSCH feedback mode 3-1 for reporting WB CQI, SB CQIs, WB W1, and SB W2s may be defined by applying a W1 and W2 transmission scheme to a PMI reporting scheme in the conventional PUSCH feedback mode 3-1 (a mode of reporting SB CQIs and a WB PMI).

In Mode 1-3, an RI, WB CQI and SB CQI for a first CW, WB CQI and SB CQI for a second CW, WB PMI_1, SB PMI_2, and the indexes of selected SBs are transmitted. The WB CQI for the first CW may be expressed as a specific value quantized to N bits. The SB CQI for the first CW may be expressed in M (M<N) bits, relative to N. The WB CQI for the second CW may also be expressed as a specific value quantized to N bits. The SB CQI for the second CW may be expressed in M (M<N) bits, relative to N. For example, N may be 4 and M may be 2. The SB CQI may be an average value of CQIs for SBs selected from all SBs included in a total band. SB PMI_2 may be a selected value suitable for SBs for which SB CQIs are calculated. In Mode 2-2-1, an RI, WB CQI and SB CQIs for a first CW, WB CQI and SB CQIs for a second CW, WB PMI_1, and SB PMI_2 are transmitted. The WB CQI for the first CW may be expressed as a specific value quantized to N bits. An SB CQI for the first CW may be expressed in M (M<N) bits, relative to N. The WB CQI for the second CW may also be expressed as a specific value quantized to N bits. An SB CQI for the second CW may be expressed in M (M<N) bits, relative to N. For example, N may be 4 and M may be 2. The SB CQIs are for all SBs included in a total band. SB PMI_2 is also for all SBs included in the total band.

In Mode 2-2-2, an RI, WB CQI and SB CQIs for a first CW, WB CQI and SB CQIs for a second CW, WB PMI_1, and SB PMI_2 are transmitted. The WB CQI for the first CW may be expressed as a specific value quantized to N bits. An SB CQI for the first CW may be expressed in M (M<N) bits, relative to N. The WB CQI for the second CW may also be expressed as a specific value quantized to N bits. An SB CQI for the second CW may be expressed in M (M<N) bits, relative to N. For example, N may be 4 and M may be 2. The SB CQIs are for all SBs included in a total band. SB PMI_2 is also for all BPs included in the total band.

In Mode 2-3, an RI, WB CQI and SB CQIs for a first CW, WB CQI and SB CQIs for a second CW, WB PMI_1, SB PMI_2s, and the indexes of selected SBs are transmitted. The WB CQI for the first CW may be expressed as a specific value quantized to N bits. An SB CQI for the first CW may be expressed in M (M<N) bits, relative to N. The WB CQI for the second CW may also be expressed as a specific value quantized to N bits. An SB CQI for the second CW may be expressed in M (M<N) bits, relative to N. For example, N may be 4 and M may be 2. The SB CQIs are calculated for SBs selected from all SBs included in a total band, independently for each of the selected SBs. SB PMI_2 s are selected values for SBs for which SB CQIs are calculated, independently for each of the SBs.

In another example, enhanced PUSCH feedback mode 2-2 for reporting average CQI of selected SBs and W2 for the selected SBs may be defined by applying a W1 and W2 transmission scheme to a PMI reporting scheme in the conventional PUSCH feedback mode 2-2 (a mode of reporting WB CQI, a WB PMI, average CQI of selected SBs, and a PMI for the selected SBs). A WB CQI per codeword may be reported and the WB CQI may be calculated on the assumption that a single precoding matrix is used for all SBs and transmission occurs in SBs of a total system bandwidth (set S). The average CQI of the selected SBs may reflect transmission only on M selected SBs and may be reported as a CQI per codeword calculated using a selected same precoding matrix for the M SBs. WB W1, WB W2, and W2 for the selected SBs may be reported in a downlink 8Tx transmission mode in which a CSI-RS port is set (transmission mode 9). A UE reports W1 (a first PMI or i1) for all SBs of the total system bandwidth (set S), W2 (a second PMI or i1) for all SBs of the total system bandwidth (set S), and W2 (a second PMI) for M selected SBs.

In Mode 3-1, WB CQI for a first CW, WB CQI for a second CW, WB PMI_1, and SB PMI_2 s are transmitted. Each of the WB CQI for the first CW and the WB CQI for the second CW may be expressed as a specific value quantized to N bits. For example, N may be 4. SB PMI_2 s are for all SBs included in a total band. For instance, CQI is reported for a WB and a PMI is reported for an SB in PUSCH feedback mode 1-2 defined in the 3GPP LTE Release-8 system and the PMI reporting scheme may be extended to feedback of W1 and W2. For example, enhanced PUSCH feedback mode 1-2 may be defined to report WB CQI, WB W1, and SB W2s. One WB CQI per codeword is reported and the WB CQI is calculated on the assumption that a selected precoding matrix is used for each SB and transmission occurs in the SBs of a total system bandwidth (set S). WB W1 (a first PMI or i1) and SB W2s (second PMIs or i2s) may be reported in the downlink 8Tx transmission mode in which a CSI-RS port is set (transmission mode 9). Herein, WB W1 (the first PMI or i1) may be reported for the total system bandwidth (set S) and WB W2 (the second PMI or i2) may be reported for each SB in the total system bandwidth (set S). In Mode 3-2, WB CQI for a first CW, WB CQI for a second CW, WB PMI_1, and an SB PMI_2 are transmitted. Each of the WB CQI for the first CW and the WB CQI for the second CW may be expressed as a specific value quantized to N bits. For example, N may be 4. SB PMI_2 is for all BPs included in a total band.

As described before, an RI may be separately encoded and CQI and a PMI may be jointly encoded in the various modes for transmitting feedback information on a PUSCH. The RI and the CQI and/or the PMI may be transmitted simultaneously on the PUSCH.

The multi-precoder reporting methods have been described above to improve feedback in the system supporting an extended antenna configuration (e.g. 3GPP LTE-A). That is, an overall precoder W may be created by combining two precoders W1 and W2 (W=W1·W2). Herein, W1 is long-term reported WB information and W2 is short-term reported SB information. However, W2 may be reported in a different manner depending on feedback overhead. For example, the reporting period and/or reported target (WB/SB) of W2 may be different in PUSCH feedback and PUCCH feedback.

In PUSCH feedback, W1 and W2 may be reported simultaneously because a PUSCH has a wide channel capacity for carrying feedback information, relative to a PUCCH. Both W1 and W2 may be WB information, or W1 may be WB information and W2 may be SB information.

For example, enhanced PUSCH feedback mode 1-2 may be defined to report WB CQI, WB W1, and SB W2s. One WB CQI per codeword is reported and the WB CQI is calculated on the assumption that a selected precoding matrix is used for each SB and transmission occurs in the SBs of a total system bandwidth (set S). WB W1 (a first PMI or i1) and SB W2s (second PMIs or i2s) may be reported in the downlink 8Tx transmission mode in which a CSI-RS port is set (transmission mode 9). Herein, WB W1 (the first PMI or i1) may be reported for the total system bandwidth (set S) and WB W2 (the second PMI or i2) may be reported for each SB in the total system bandwidth (set S).

In a similar manner, enhanced PUSCH feedback mode 2-2 for reporting average CQI of selected SBs and W2 for the selected SBs may be defined by applying a W1 and W2 transmission scheme to a PMI reporting scheme in the conventional PUSCH feedback mode 2-2 (a mode of reporting WB CQI, a WB PMI, average CQI of selected SBs, and a PMI for the selected SBs). A WB CQI per codeword may be reported and the WB CQI may be calculated on the assumption that a single precoding matrix is used for all SBs and transmission occurs in SBs of a total system bandwidth (set S). The average CQI of the selected SBs may reflect transmission only on M selected SBs and may be reported as a CQI per codeword calculated using a selected same precoding matrix for the M SBs. WB W1, WB W2, and W2 for the selected SBs may be reported in a downlink 8Tx transmission mode in which a CSI-RS port is set (transmission mode 9). A UE reports W1 (a first PMI or i1) for all SBs of the total system bandwidth (set S), W2 (a second PMI or i1) for all SBs of the total system bandwidth (set S), and W2 (a second PMI) for M selected SBs.

In a similar manner, enhanced PUSCH feedback mode 3-1 for reporting SB CQIs, WB W1 and SB W2s may be defined by applying a W1 and W2 transmission scheme to a PMI reporting scheme in the conventional PUSCH feedback mode 3-1 (a mode of reporting SB CQIs and a WB PMI).

As described before, enhanced PUSCH feedback modes 1-2, 2-2, and 3-1 may be summarized in Table 26.

TABLE 26

| | | PMI Feedback Type With PMI (CL) |
|---|---|---|
| PUSCH CQI feedback Type | Wideband CQI | Mode 1-2: Multiple PMI<br>Wideband CQI for $1^{st}$ CW<br>Wideband CQI for $2^{nd}$ CW if RI >1<br>Wideband W1<br>Subband W2 on each subband |
| | UE Selected | Mode 2-2: Multiple PMI<br>Wideband CQI for $1^{st}$ CW<br>CQI for $1^{st}$ CW on M subband<br>Wideband CQI for $2^{nd}$ CW if RI >1<br>CQI for $2^{nd}$ CW on M subband if RI >1<br>Wideband W1<br>Wideband W2<br>W2 on M subband<br>Selected subband Indicator |
| | Higher layer configured | Mode 3-1: Single PMI<br>Subband CQIs for $1^{st}$ CW on each subband<br>Wideband CQI for $2^{nd}$ CW if RI >1<br>Subband CQIs for $2^{nd}$ CW on each subband if RI >1<br>Wideband W1<br>Wideband W2 |

A CSI reporting method according to an embodiment of the present invention is described with reference to FIG. 24.

A UE may measure a downlink channel state regarding a downlink transmission from an eNB and feedback the downlink channel state measurement to the eNB on uplink. For example, when the eNB uses 8 Tx antennas for the downlink transmission, the eNB may transmit CSI-RSs through 8 antenna ports (antenna port 15 to antenna port 22). The UE may transmit the results of measuring a downlink channel state in the CSI-RSs (an RI, a PMI, CQI, etc.). Various examples of the present invention may be applied to select and calculate an RI/PMI/CQI. The eNB may determine the number of layers, a precoder, and an MCS level for downlink transmission based on the CSI (RI/PMI/CQI) and transmit a downlink signal based on the determined information.

Figure 24:
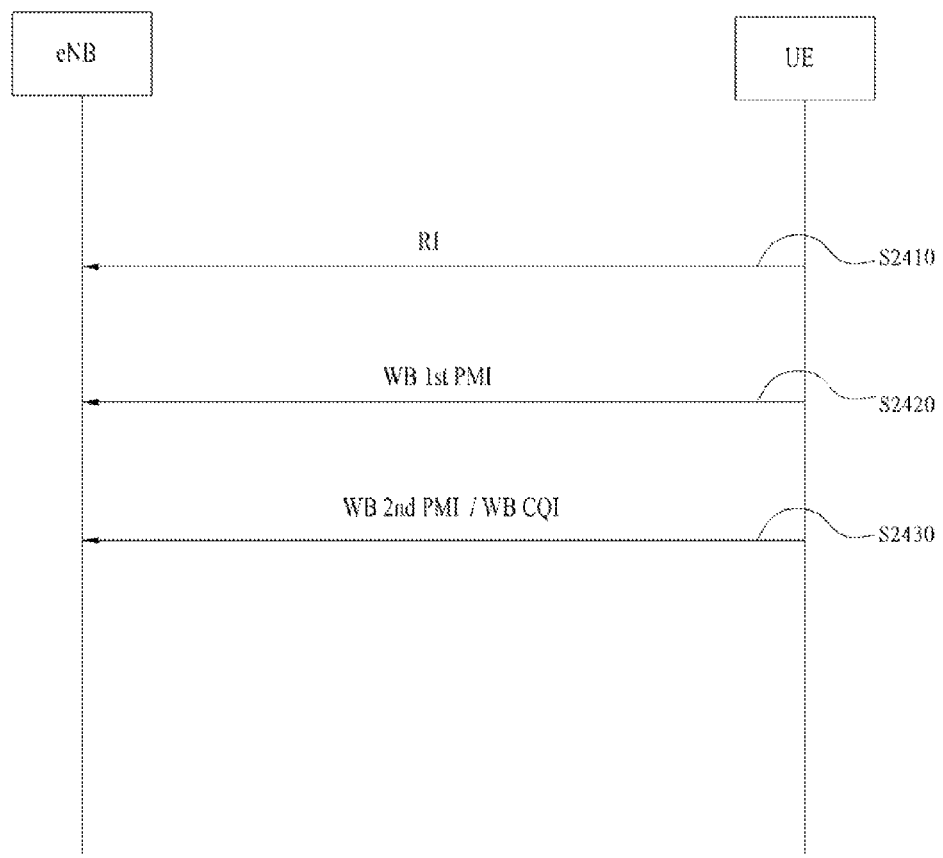
FIG. 24 is a flowchart illustrating a channel state information transmission method according to an embodiment of the present invention.

Referring to FIG. 24, the UE may feed back an RI through a first uplink subframe (S2410). The UE may feed back a first PMI through a second uplink subframe (S2420). The UE may feed back a second PMI and CQI through a third uplink subframe (S2430).

Here, an RI transmission timing, a first PMI transmission timing and a second PMI and CQI transmission timing (that is, the first, second and third subframes) can be determined according to above-described exemplary embodiments of the present invention.

A preferred precoding matrix of a UE can be indicated by a combination of the first PMI and the second PMI. For example, the first PMI can indicate precoding matrix candidates applied to the downlink transmission and the second PMI can indicate one of the precoding matrix candidates.

The CSI (the RI, the first PMI, the second PMI and CQI) may be transmitted in the respective uplink subframes over a PUCCH. That is, the CSI (the RI, the first PMI, the second PMI and CQI) can be periodically transmitted according to reporting periods thereof. The CSI reporting periods may be determined according to the above-mentioned various embodiments of the present invention.

The first PMI, the second PMI and CQI may be feedback information regarding a WB.

The descriptions of the above various embodiments of the present invention may be applied alone or in a combination of two or more in relation to the CSI transmission method of the present invention described with reference to FIG. 24. A redundant description will not be provided herein, for clarity.

In addition, CSI feedback for MIMO transmission between an eNB and an RN (a backhaul uplink and a backhaul downlink) and CSI feedback for MIMO transmission between an RN and a UE (an access uplink and an access downlink) may be implemented based on the same principle of the present invention.

Figure 25:
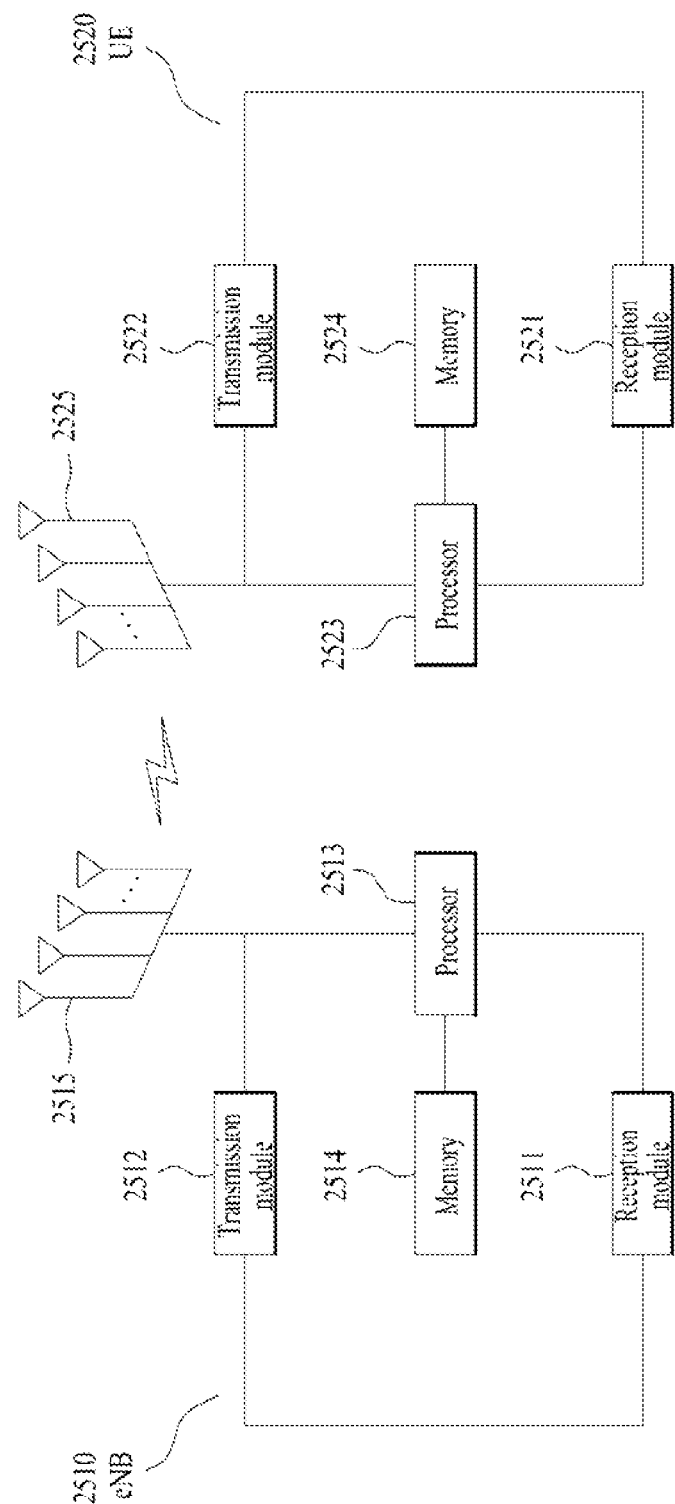
FIG. 25 shows configurations of a base station (BS) and a UE according to an embodiment of the present invention.

FIG. 25 is a block diagram of an eNB and a UE according to the present invention.

Referring to FIG. 25, an eNB 2510 according to the present invention may include an Rx module 2511, a Tx module 2512, a processor 2513, a memory 2514, and a plurality of antennas 2515. The existence of the plurality of antennas 2515 means that the eNB 2510 supports MIMO transmission and reception. The Rx module 2511 may receive uplink signals, data, and information from UEs. The Tx module 2512 may transmit downlink signals, data, and information to UEs. The processor 2513 may provide overall control to the eNB 2510. In accordance with an embodiment of the present invention, the eNB 2510 may be configured so as to transmit downlink signals through up to 8 Tx antennas and receive CSI regarding a downlink transmission from a UE 2520. The processor 2513 may be configured to receive an RI in a first subframe, receive a first PMI in a second subframe and receive a second PMI and CQI in a third subframe through the Rx module 2511. A preferred precoding matrix of the UE may be indicated by a combination of the first PMI and the second PMI.

The processor 5313 processes information received at the eNB 2510, information to be transmitted to the outside, etc. The memory 2514 may store the processed information for a predetermined time and may be replaced by a component like a buffer (not shown).

The UE 2520 according to the present invention may include an Rx module 2521, a Tx module 2522, a processor 2523, a memory 2524, and a plurality of antennas 2525. The existence of the plurality of antennas 2525 means that the UE 2520 supports MIMO transmission and reception. The Rx module 2521 may receive downlink signals, data, and information from an eNB. The Tx module 2522 may transmit uplink signals, data, and information to an eNB. The processor 2523 may provide overall control to the UE 2520.

In accordance with an embodiment of the present invention, the UE 2520 may be configured so as to receive downlink signals through up to 8 Tx antennas from the eNB 2510 and feed back CSI regarding the downlink transmission to the eNB 2510. The processor 2523 may be configured to transmit an RI in a first subframe, transmit a first PMI in a second subframe and transmit a second PMI and CQI in a third subframe through the Tx module 2522. A preferred precoding matrix of the UE may be indicated by a combination of the first PMI and the second PMI.

The processor 2523 of the UE 2520 processes information received at the UE 2520, information to be transmitted to the outside, etc. The memory 2524 may store the processed information for a predetermined time and may be replaced by a component like a buffer (not shown).

The descriptions of the foregoing various embodiments of the present invention may be applied alone or in a combination of two or more to the specific configurations of the eNB and the UE. A redundant description is not provided herein for clarity.

The description of the eNB 2510 in FIG. 25 may be applied to an RN as a downlink transmission entity or an uplink reception entity, and the description of the UE 2520 in FIG. 25 may be applied to an RN as a downlink reception entity or an uplink transmission entity.

The embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSDPs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention.

For example, the structures of the above-described embodiments of the present invention can be used in combination. The above embodiments are therefore to be construed in all aspects as illustrative and not restrictive. Therefore, the present invention intends not to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The methods for effectively reporting feedback information in a multi-antenna system according to the above-described embodiments of the present invention are applicable to various multi-antenna mobile communication systems (all mobile communication systems based on multiple access schemes such as OFDMA, SC-FDMA, CDMA, TDMA etc.).

The invention claimed is:

1. A method for periodically transmitting channel state information through an uplink channel in a wireless communication system, the method comprising:
 transmitting a rank indicator (RI) in a first subframe;
 transmitting a first precoding matrix indicator (PMI) in a second subframe; and
 transmitting a second PMI and a channel quality indicator (CQI) in a third subframe,
 wherein the RI is transmitted according to a first reporting period,
 wherein the first PMI is transmitted according to a second reporting period,
 wherein the second PMI and the CQI are transmitted according to a third reporting period,
 wherein the second reporting period is equal to or shorter than the first reporting period,
 and the second reporting period is longer than the third reporting period, and
 wherein the first PMI is a wideband first PMI, the second PMI is a wideband second PMI, and the CQI is a wideband CQI.

2. The method according to claim 1, wherein a specific offset is applied between the first subframe and the second subframe.

3. The method according to claim 1, wherein a preferred precoding matrix of a user equipment (UE) is indicated by a combination of the first PMI and the second PMI.

4. The method according to claim 1, wherein the uplink channel is a physical uplink control channel (PUCCH).

5. The method according to claim 1, wherein the RI, the first PMI, the second PMI and the CQI correspond to channel state information for downlink 8-transmit antenna transmission.

6. A method for periodically receiving channel state information through an uplink in a wireless communication system, the method comprising:
- receiving a rank indicator (RI) in a first subframe;
- receiving a first precoding matrix indicator (PMI) in a second subframe; and
- receiving a second PMI and a channel quality indicator (CQI) in a third subframe,
- wherein the RI is transmitted according to a first reporting period,
- wherein the first PMI is transmitted according to a second reporting period,
- wherein the second PMI and the CQI are transmitted according to a third reporting period,
- wherein the second reporting period is equal to or shorter than the first reporting period,
- and the second reporting period is longer than the third reporting period, and
- wherein the first PMI is a wideband first PMI, the second PMI is a wideband second PMI, and the CQI is a wideband CQI.

7. A user equipment (UE) for periodically transmitting channel state information through an uplink channel in a wireless communication system, the UE comprising:
- a reception module;
- a transmission module; and
- a processor, wherein the processor is configured to:
  - transmit, using the transmission module, a rank indicator (RI) in a first subframe;
  - transmit, using the transmission module, a first precoding matrix indicator (PMI) in a second subframe; and
  - transmit, using the transmission module, a second PMI and a channel quality indicator (CQI) in a third subframe,
  - wherein the RI is transmitted according to a first reporting period,
  - wherein the first PMI is transmitted according to a second reporting period,
  - wherein the second PMI and the CQI are transmitted according to a third reporting period,
  - wherein the second reporting period is equal to or shorter than the first reporting period, and the second reporting period is longer than the third reporting period,
  - wherein the first PMI is a wideband first PMI, the second PMI is a wideband second PMI, and the CQI is a wideband CQI.

8. An evolved Node B (eNB) for receiving channel state information through an uplink channel in a wireless communication system, the eNB comprising:
- a reception module;
- a transmission module; and
- a processor, wherein the processor is configured to:
  - receive, using the reception module, a rank indicator (RI) in a first subframe;
  - receive, using the reception module, a first precoding matrix indicator (PMI) in a second subframe; and
  - receive, using the reception module, a second PMI and a channel quality indicator (CQI) in a third subframe,
  - wherein the RI is transmitted according to a first reporting period,
  - wherein the first PMI is transmitted according to a second reporting period,
  - wherein the second PMI and the CQI are transmitted according to a third reporting period,
  - wherein the second reporting period is equal to or shorter than the first reporting period, and the second reporting period is longer than the third reporting period, and
  - wherein the first PMI is a wideband first PMI, the second PMI is a wideband second PMI, and the CQI is a wideband CQI.

* * * * *